US009058342B2

(12) United States Patent
Yamaguchi

(10) Patent No.: US 9,058,342 B2
(45) Date of Patent: Jun. 16, 2015

(54) IMAGE CLASSIFICATION DEVICE, METHOD, PROGRAM, RECORDING MEDIA WITH PROGRAM THEREON, AND INTEGRATED CIRCUIT

(75) Inventor: Koichiro Yamaguchi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 531 days.

(21) Appl. No.: 13/395,761

(22) PCT Filed: Jul. 27, 2011

(86) PCT No.: PCT/JP2011/004251

§ 371 (c)(1), (2), (4) Date: Mar. 13, 2012

(87) PCT Pub. No.: WO2012/017620

PCT Pub. Date: Feb. 9, 2012

(65) Prior Publication Data

US 2012/0170856 A1 Jul. 5, 2012

(30) Foreign Application Priority Data

Aug. 4, 2010 (JP) ................................ 2010-175068

(51) Int. Cl.
*G06K 9/50* (2006.01)
*G06F 17/30* (2006.01)

(52) U.S. Cl.
CPC .... *G06F 17/30268* (2013.01); *G06F 17/30247* (2013.01)

(58) Field of Classification Search
None
See application file for complete search history.

(56) References Cited

U.S. PATENT DOCUMENTS 8,611,677 B2 * 12/2013 Das et al. ...................... 382/225
8,762,659 B2 * 6/2014 Date et al. ..................... 711/156
2005/0134946 A1 6/2005 Tsue et al.

(Continued)

FOREIGN PATENT DOCUMENTS

CN 101150977 3/2008
JP 2006-295890 10/2006

(Continued)

OTHER PUBLICATIONS

International Search Report issued Aug. 30, 2011 in corresponding International Application No. PCT/JP2011/004251.
Office Action and Search Report issued Mar. 9, 2015 in Chinese Application No. 201180004116.7, with partial English translation.

*Primary Examiner* — Thomas Conway
(74) *Attorney, Agent, or Firm* — Wenderoth, Lind & Ponack, L.L.P.

(57) ABSTRACT

According to a conventional image classification device that extracts a feature from an image and classifies the image with use of the extracted feature, in the case where one image and another one image, which are included in an image group, each have a different feature, the one image and the other one image might be each classified into a different category. In order to solve this problem, an image classification device relating to the present invention calculates, with respect to each of persons appearing in a plurality of images included in an image group which have been photographed with respect to one event, a main character degree that is an index indicating an important degree in units of image groups, and classifies the images into any one of different classification destination events in units of image groups based on the calculated main character degrees.

11 Claims, 18 Drawing Sheets

(56) References Cited

U.S. PATENT DOCUMENTS

2007/0103565 A1 5/2007 Xu et al.
2007/0292011 A1 12/2007 Nishimura et al.
2008/0086511 A1* 4/2008 Takao et al. ................ 707/104.1
2008/0089590 A1 4/2008 Isomura et al.
2008/0089592 A1 4/2008 Isomura
2009/0185723 A1* 7/2009 Kurtz et al. ................... 382/118
2009/0257663 A1* 10/2009 Luo et al. ...................... 382/224
2012/0124378 A1 5/2012 Chang

FOREIGN PATENT DOCUMENTS

JP 2006-345492 12/2006
JP 2007-122110 5/2007
JP 2008-250855 10/2008
JP 4232774 12/2008
JP 4315344 5/2009

* cited by examiner

| Image ID | Face feature value | | | | | Color feature value | | | | | Photographing time |
|---|---|---|---|---|---|---|---|---|---|---|---|
| | Face ID | Face area | Face position | Face angle | Coordinates | Red | Blue | Green | White | ... | |
| 00001 | 0001 | 0.3 | 0.9 | 1 | x0, y0-x1, y1 | 0.1 | 0.2 | 0.6 | 0.1 | ... | 2010/03/01 15:00:00 |
| | 0002 | 0.1 | 0.5 | 0.9 | x2, y2-x3, y3 | | | | | | |
| | ... | ... | ... | ... | ... | | | | | | |
| 00002 | 0005 | 0.1 | 0.1 | 1 | x4, y4-x5, y5 | 0.1 | 0.3 | 0.5 | 0.1 | ... | 2010/03/01 15:01:00 |
| | 0006 | 0.1 | 0.1 | 1 | x6, y6-x7, y7 | | | | | | |
| | ... | ... | ... | ... | ... | | | | | | |
| ... | ... | ... | ... | ... | ... | ... | ... | ... | ... | ... | ... |

| Label | Face ID_1 | Face ID_2 | Face ID_3 | ··· |
| --- | --- | --- | --- | --- |
| Son | 0001 | 0003 | 0101 | ··· |
| Mother | 0002 | 0005 | 0151 | ··· |
| Father | 0004 | 0153 | 0155 | ··· |
| ··· | ··· | ··· | ··· | ··· |
| Irrespective person A | 0005 | 0008 | — | ··· |
| Irrespective person B | 0033 | 0039 | 0040 | ··· |
| Irrespective person C | 0034 | — | — | ··· |
| ··· | ··· | ··· | ··· | ··· |

FIG. 6

| Image group ID (601) | Label (602) | Dispersion degree (603) | Main character degree (604) | Event name (605) | Privateness degree (606) |
|---|---|---|---|---|---|
| 0001 | Son | 1 | 5.8 | Mt. Rokko in early summer of 2009 | Extremely high |
| | Mother | 0.5 | 4.0 | | |
| | Father | 0.5 | 3.8 | | |
| | Irrespective person A | 0.1 | 0.2 | | |
| | ⋮ | ⋮ | ⋮ | | |
| ⋮ | ⋮ | ⋮ | ⋮ | ⋮ | ⋮ |

FIG. 7

| | | Important person | | | |
|---|---|---|---|---|---|
| | | Son | Mother | Father | All family members |
| Privateness degree | Extremely high | Birthday party | — | — | Trip |
| | High | Athletic meet | — | — | — |
| | Moderate | Excursion | — | — | — |
| | Low | — | Wedding party | — | — |

| Main character degree | Classification destination event |
|---|---|
| 3 or higher | Photographing at home |
| 1 or higher and less than 3 | Photographing at office |
| Less than 1 | Landscape |

IMAGE CLASSIFICATION DEVICE, METHOD, PROGRAM, RECORDING MEDIA WITH PROGRAM THEREON, AND INTEGRATED CIRCUIT

TECHNICAL FIELD

The present invention relates to an image classification device that classifies images.

BACKGROUND ART

With the widespread of digital image photographing apparatuses such as digital still cameras and mobile phones having a camera function, recording media for recording photographed images such as hard discs have been distributed inexpensively.

Generally, users of digital image photographing apparatuses and the like store photographed images in a recording medium such as a hard disc with a large capacity.

The users have difficulty searching a large amount of stored images for a desired image. For this reason, images are classified into categories in order to allow the user to easily perform image search.

As an image classification art, there has been known an art of extracting a feature from each of stored images and classifying each of the images into a classification destination with use of the extracted feature, as disclosed in Patent Literatures 1 and 2 for example.

CITATION LIST

Patent Literature

[Patent Literature 1] Japanese Patent No. 4232774

[Patent Literature 2] Japanese Patent No. 4315344

SUMMARY OF INVENTION

Technical Problem

An opportunity at the users photograph images is often an event such as a picnic and river fishing. Also, a case where the users view images is often a case where the users view, in units of image groups, images photographed with respective to an event.

There occurs a demand for classification of images included in an image group, which have been photographed with respective to an event, into the same category.

However, with the above art of extracting a feature from each image and classifying the image with use of the extracted feature, in the case where a certain image included in an image group has a feature different from a feature of another image included in the image group, the certain image and the other image are each classified into a different category.

Specifically, assume that classification destination categories include a category “picnic” and a category “river fishing”, for example. If an image group composed of images photographed with respective to a picnic includes an image representing a scene where a person is playing in the riverside, only the image representing the scene where person is playing in the riverside is classified into the category “river fishing”, and other remaining images are classified into the category “picnic”.

In view of the above problem, the present invention aims to provide an image classification device capable of performing image classification based on a certain degree of reasonable reference so as to prevent images included in an image group composed of images photographed with respective to an event from each being classified into a different category.

Solution to Problem

In order to solve the above problem, the image classification device relating to the present invention is an image classification device comprising: an image specification unit operable to specify, among a plurality of images included in an image group which have been sequentially photographed with respect to one event, one or more images in which an object having a predetermined feature appears; an evaluation value calculation unit operable to calculate an evaluation value of the object having the predetermined feature based on a degree of dispersion of the images specified by the image specification unit among the plurality of images included in the image group in terms of values indicated by respective pieces of time information each reflecting a photographing time of a corresponding one of the plurality of images; and an image group classification unit operable to classify the event relating to the image group based on the evaluation value calculated by the evaluation value calculation unit.

Advantageous Effects of Invention

The image classification device relating to the present invention with the above structure is capable of performing image classification so as to prevent images included in an image group composed of images photographed with respective to an event from each being classified into a different category.

BRIEF DESCRIPTION OF DRAWINGS

FIG. 4 shows the data structure of image feature information stored in an image feature information storage unit 232.

FIG. 5 shows the data structure of a face correspondence table stored in a face correspondence table storage unit 235.

FIG. 6 shows the data structure of main character degree information stored in a main character degree information storage unit 233.

FIG. 7 shows the data structure of event feature information stored in an event feature information storage unit 234.

FIG. 12 shows an example of images photographed with respective to an event where a member of a family participated in.

FIG. 13 shows an example of images photographed with respective to an event where members of the family participated in.

FIG. 17 shows the data structure of event feature information relating to a supplementary modification.

DESCRIPTION OF EMBODIMENTS

Embodiment 1

The following describes, as one embodiment of the image classification device relating to the present invention, an image classification device that calculates, with respect to each of persons appearing in a plurality of images included in an image group which have been photographed with respect to one event, a main character degree that is an index indicating an important degree, and classifies the images into any one of different classification destination events in units of image groups based on the calculated main character degrees.

Here, the image group is a group of a plurality of images designated by a user. The image group is, for example, a group of images photographed with respective to an event of trip to Mt. Rokko in early summer of 2009, a group of images photographed with respective to an event of a birthday party held on a child's birthday in 2010.

<Structure>

<Hardware Structure of Image Classification Device 100>

Figure 1:
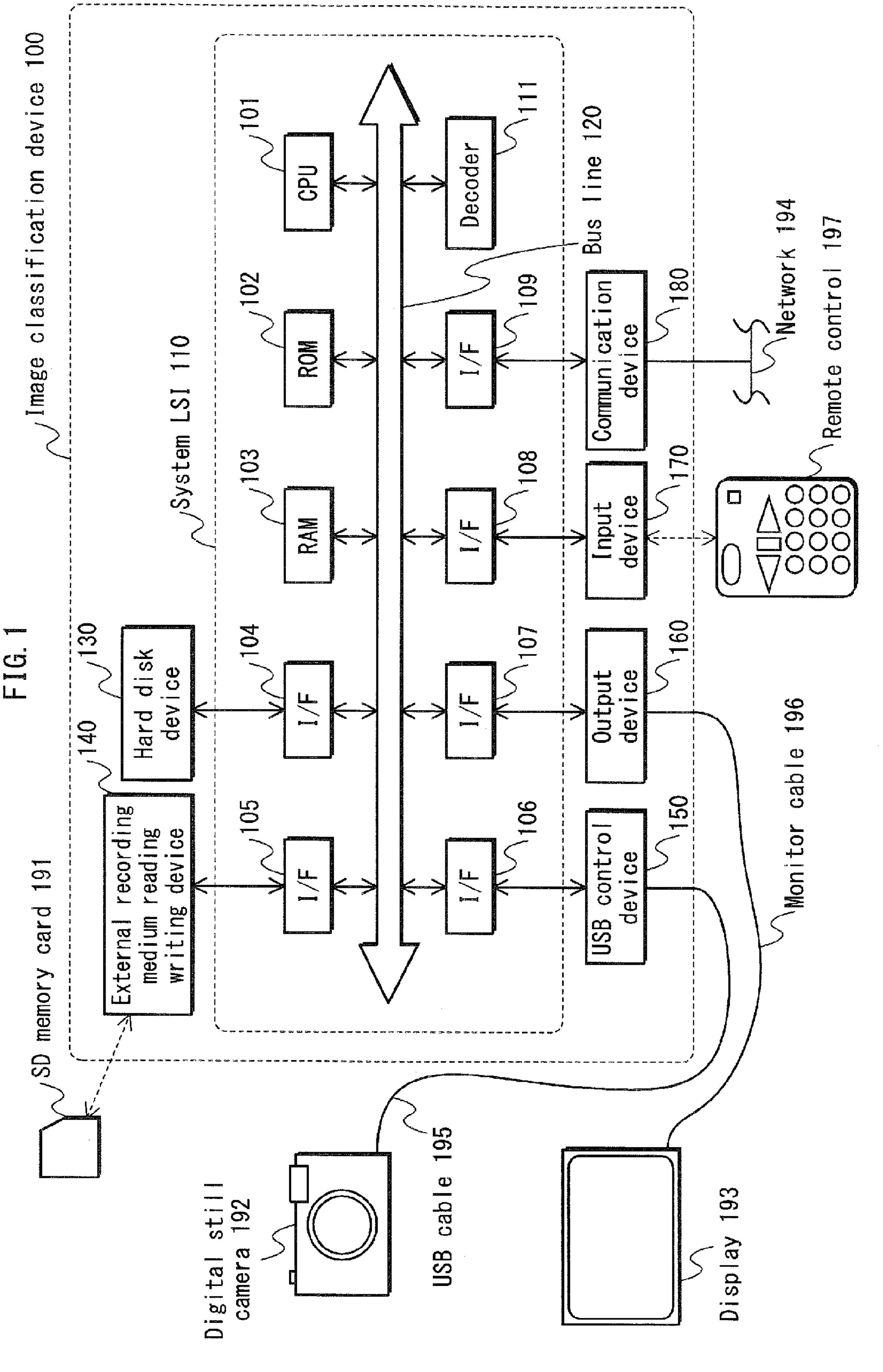
FIG. 1 is a block diagram showing the hardware structure of an image classification device 100.

FIG. 1 is a block diagram showing the main hardware structure of an image classification device 100.

The image classification device 100 includes a system LSI (Large Scale Integrated circuit) 110, a hard disk device 130, an external recording medium reading writing device 140, a USB (Universal Serial Bus) control device 150, an output device 160, an input device 170, and a communication device 180. The image classification device 100 has a function of storing images that are each a digital photograph as data encoded in the JPEG (Joint Photographic Experts Group) format and classifying the stored images.

Also, the image classification device 100 connects with a device that has recorded therein images typified by a digital still camera 192 via a removable USB cable 195, connects with a display 193 for displaying images via a monitor cable 196, and connects with a network 194. The image classification device 100 has a function of performing wireless communication with a remote control 197 for receiving an operation command from a user, and reading and writing data from and to an external recording medium typified by an SD memory card 191.

The system LSI 110 is an LSI manufactured by integrating onto a single integrated circuit, a CPU 101, a ROM 102, a RAM 103, a hard disk device interface 104, an external recording medium reading writing device interface 105, a USB control device interface 106, an output device interface 107, an input device interface 108, a communication device interface 109, a decoder 111, and a bus line 120. The system LSI 110 connects with the hard disk device 130, the external recording medium reading writing device 140, the USB control device 150, the output device 160, the input device 170, and the communication device 180.

The CPU 101 connects with the bus line 120, and executes a program stored in the ROM 102 or the RAM 103 to control the ROM 102, the RAM 103, the hard disk device 130, the external recording medium reading writing device 140, the USB control device 150, the output device 160, the input device 170, the communication device 180, and the decoder 111 thereby to realize various functions. For example, the CPU 101 realizes a function of reading encoded image data from the hard disk device 130, decoding the read image data, and outputting the decoded image data to the display 193.

The ROM 102 connects with the bus line 120, and stores therein a program that defines the operations of the CPU 101 and data for use by the CPU 101.

The RAM 103 connects with the bus line 120, and temporarily stores therein data resulting from execution of a program by the CPU 101. Also, the RAM 103 temporarily stores therein data read from the hard disk device 130 and the external recording medium reading writing device 140, data to be written into the hard disk device 130 and the external recording medium reading writing device 140, data received by the communication device 180, data to be transmitted by the communication device 180, and so on.

The decoder 111 is a DSP (Digital Signal Processor) having a function of decoding encoded image data. The decoder 111 connects with the bus line 120, and is controlled by the CPU 101. The decoder 111 has a function of decoding JPEG data.

The hard disk device interface 104, the external recording medium reading writing device interface 105, the USB control device interface 106, the output device interface 107, the input device interface 108, and the communication device interface 109 are interfaces that mediate signal transmission between the image classification device 100 and the hard disk device 130, the external recording medium reading writing device 140, the USB control device 150, the output device 160, the input device 170, the communication device 180, and the bus line 120, respectively.

The hard disk device 130 connects with the hard disk device interface 104, and is controlled by the CPU 101. The hard disk device 130 has a function of reading and writing data from and into a built-in hard disk.

The external recording medium reading writing device 140 connects with the external recording medium reading writing device interface 105, and is controlled by the CPU 101. The external recording medium reading writing device 140 has a function of reading and writing data from and into an external recording medium.

Here, the external recording medium is a DVD (Digital Versatile Disc), a DVD-R, a DVD-RAM, a BD (Blu-ray Disc), a BD-R, a BD-RE, the SD memory card 191, and the like. The external recording medium reading writing device 140 has a function of reading data from the DVD, the BD, and the like, and has a function of writing and reading data into and from the DVD-R, the BD-R, the BD-RE, the SD memory card 191, and the like.

The USB control device 150 connects with the USB control device interface 106, and is controlled by the CPU 101. The USB control device 150 has a function of reading and writing data from and into an external device via the removable USB cable 195.

Here, the external device is a device for storing images such as the digital still camera 192, a personal computer, and a mobile phone having a camera function. The USB control device 150 writes and reads data into and from the external device via the USB cable 195.

The output device 160 connects with the output device interface 107 and the monitor cable 196, and is controlled by the CPU 101. The output device 160 has a function of outputting, via the monitor cable 196, data to be displayed on the display 193.

The input device 170 connects with the input device interface 108, and is controlled by the CPU 101. The input device 170 has a function of receiving an operation command transmitted wirelessly from the user via the remote control 197, and transmitting the received operation command to the CPU 101.

The communication device 180 connects with the communication device interface 109 and the network 194, and is controlled by the CPU 101. The communication device 180 has a function of transmitting and receiving data to and from an external communication device via the network 194.

Here, the network 194 is realized by optical communication lines, telephone lines, wireless lines, or the like, and connects with an external communication device, the Internet, and so on.

Also, the external communication device is a device for storing therein images and the program that defines the operations of the CPU 101, such as an external hard disk device. The communication device 180 reads data from the external communication device via the network 194.

The image classification device 100, which is realized by the hardware described above, realizes various functions by the CPU 101 executing the program stored in the ROM 102 or the RAM 103 to control the ROM 102, the RAM 103, the hard disk device 130, the external recording medium reading writing device 140, the USB control device 150, the output device 160, the input device 170, the communication device 180, and the decoder 111.

The following describes the functional structure of the image classification device 100 with reference to the figure.

<Functional Structure of Image Classification Device 100>

Figure 2:
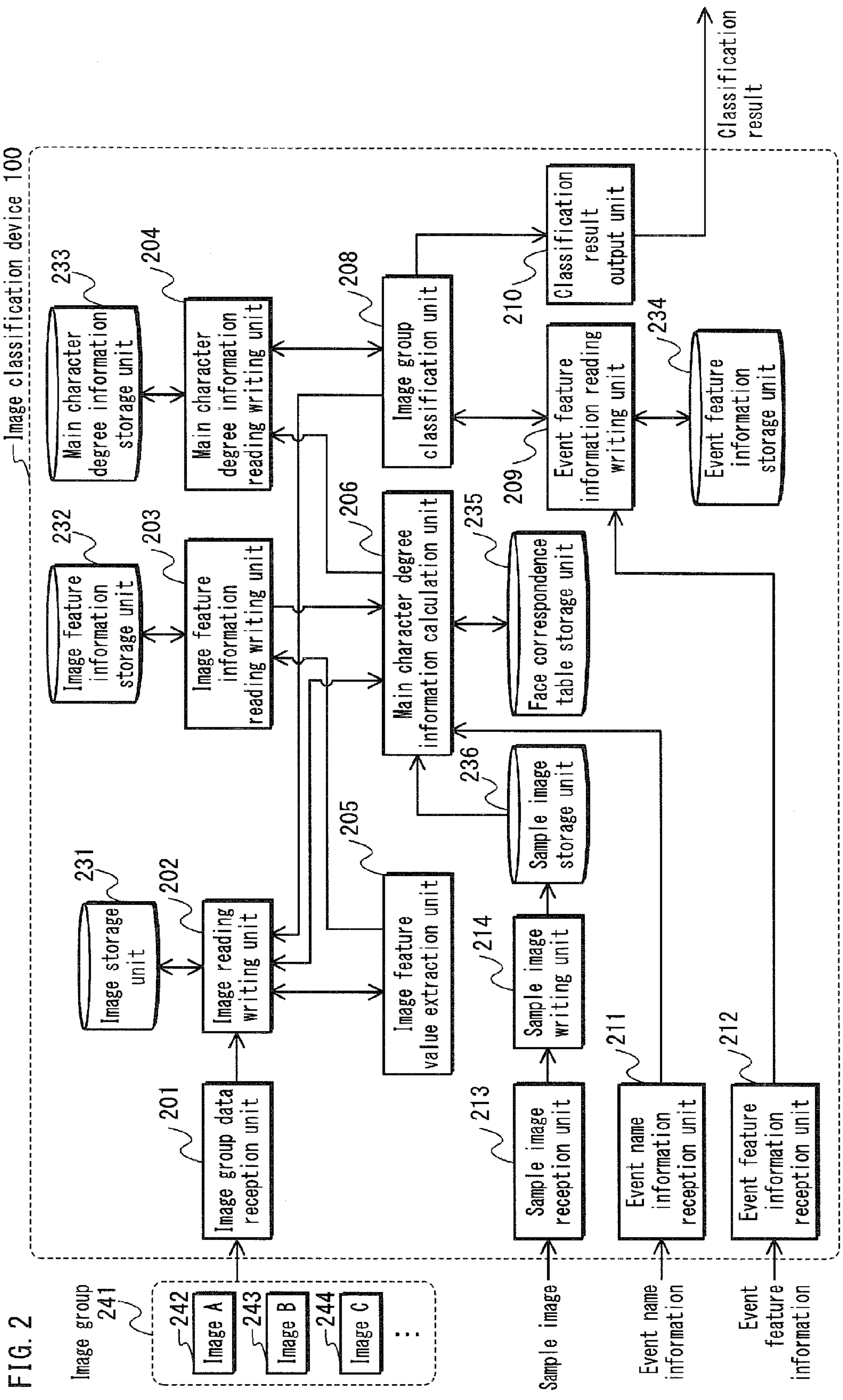
FIG. 2 is a block diagram showing the functional structure of the image classification device 100.

FIG. 2 is a block diagram showing the main functional blocks of the image classification device 100.

The image classification device 100 includes an image group data reception unit 201, an image reading writing unit 202, an image feature information reading writing unit 203, a main character degree information reading writing unit 204, an image feature value extraction unit 205, a main character degree information calculation unit 206, an image group classification unit 208, an event feature information reading writing unit 209, a classification result output unit 210, an event name information reception unit 211, an event feature information reception unit 212, a sample image reception unit 213, a sample image writing unit 214, an image storage unit 231, an image feature information storage unit 232, a main character degree information storage unit 233, an event feature information storage unit 234, and a face correspondence table storage unit 235.

The image group data reception unit 201 connects with the image reading writing unit 202. The image group data reception unit 201 has a function of receiving designation of all of two or more images included in an image group 241, and reading the designated images as images included in the same image group.

The image group data reception unit 201 receives an image from an external recording medium via the external recording medium reading writing device 140, from an external device via the USB control device 150, or from an external communication device via the communication device 180.

Also, the image group data reception unit 201 has a function of assigning an image ID to each of received images for identifying the received image.

The image storage unit 231 is a storage region for storing digital photographs, which are each an image, as pieces of image data encoded in the JPEG format. The image storage unit 231 is implemented as a part of regions of the hard disk built in the hard disk device 130.

The pieces of image data one-to-one correspond to pieces of metadata each containing a date and time of photographing a corresponding image. The image storage unit 231 stores therein the pieces of image data in one-to-one correspondence with the pieces of metadata.

The pieces of data stored in the image storage unit 231 are logically managed by the directory structure under the file system.

Figure 3:
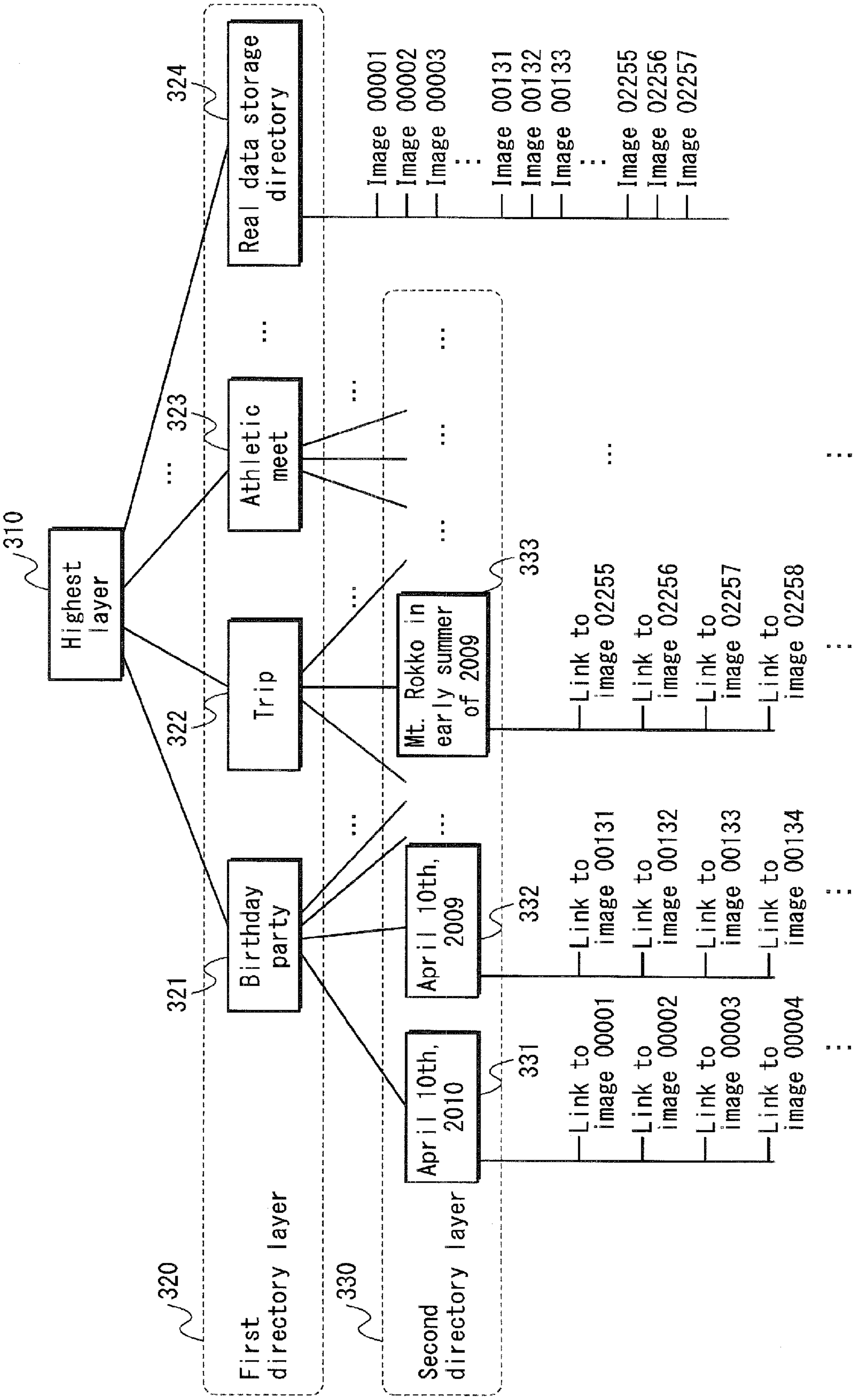
FIG. 3 shows the directory structure of an image storage unit 231.

FIG. 3 shows the directory structure of the image storage unit 231.

As shown in FIG. 3, the image storage unit 231 has the directory structure that is composed of three layers of a highest layer 310, a first directory layer 320, and a second directory layer 330.

The first directory layer 320 includes a plurality of classification destination event directories such as a birthday party directory 321, a trip directory 322, and an athletic meet directory 323, and a real data storage directory 324.

Here, the classification destination event directories are each a directory whose name is the same with a name of a classification destination event that is a classification destination of an image group. The classification destination event directories each have a different name.

The real data storage directory 324 is a directory for storing pieces of image data and pieces of metadata in one-to-one correspondence with each other. The pieces of image data and the pieces of metadata are stored in only the real data storage directory 324.

The second directory layer 330 includes a plurality of event directories such as a directory 331 of Apr. 10, 2010, a directory 332 of Apr. 10, 2009, and a directory 333 of Mt. Rokko in early summer of 2009.

The event directories are each a directory corresponding to an image group composed of images received by the image group data reception unit 201. The real data storage directory 324 stores therein information indicating addresses of respective pieces of image data of all the images included in the image group. This allows the event directory to link to the pieces of image data.

The event directories are each located under a classification destination event directory corresponding to a classification destination event into which a corresponding image group is classified.

In the case where an image group is classified into a plurality of classification destination events, there are event directories that are equal in number to the classification destination events into which the image group is classified and have the same name and a link to the same images.

Returning to FIG. 2, the description continues on the functional structure of the image classification device 100.

The image reading writing unit 202 connects with the image group data reception unit 201, the image feature value extraction unit 205, the main character degree information calculation unit 206, and the image group classification unit 208. The image reading writing unit 202 has a function of reading and writing images and corresponding pieces of metadata from and into the image storage unit 231, a function of modifying the directory structure of the image storage unit 231, and a function of changing the link to pieces of image data.

The image feature value extraction unit 205 connects with the image reading writing unit 202 and the image feature information reading writing unit 203. The image feature value extraction unit 205 has the following three functions.

Function 1: a function of storing therein predetermined models each representing a feature of a face of a person, attempting to recognize a face appearing in an image with reference to the stored face models, calculating an area of a region of the recognized face, a position of the recognized face, and an angle of the recognized face, and sequentially assigning, to the recognized face, a face ID for specifying the recognized face Here, the face models are each, for example, information on the brightness of a part of a human face such as eyes, a nose, a mouse and a relative positional relation between these parts.

Function 2: a function of, with respect to each of pixels constituting the image, specifying the pixel has which color of black, blue, green, white, and so on, based on a color component of the pixel such as the brightness of red, green, and blue, and a function of, with respect to each of the specified colors, calculating a ratio of the number of pixels that have the specified color to the total number of pixels constituting the image, as a color feature value of the image Here, in order to specify a color of a certain pixel as black for example, the certain pixel needs to have each of the brightness of red, green, blue less than 10%.

Function 3: a function of generating image feature information (described later) based on the area of the region of the recognized face, the position of the recognized face, and the angle of the recognized face, the calculated color feature value, and so on The image feature information storage unit 232 is a storage region for storing image feature information, and is implemented as a part of the regions of the hard disk built in the hard disk device 130.

FIG. 4 shows the data structure of image feature information stored in the image feature information storage unit 232.

As shown in FIG. 4, the image feature information includes an image ID 401 for specifying a corresponding image, a face feature value 402 indicating a feature of a face appearing in the image recognized by the image feature value extraction unit 205 (hereinafter, "recognized face"), a color feature value 403 indicating a color feature of the image, and a photographing time 404 indicating a time and date at which the image was photographed.

Furthermore, the face feature value 402 includes a face ID 411 for specifying the recognized face, a face area 412 indicating a ratio of an area of the recognized face to the area of the image, a face position 413 indicating a degree of misalignment of a position of the recognized face from the center in the image, a face angle 414 indicating an angle of the recognized face, and coordinates 415 indicating coordinates of the region of the recognized face.

The face area 412 is a value indicating the ratio of the area of the recognized face to the area of the image, which is normalized to a value of 1 when the recognized face appears in the entire image.

The face position 413 is a value indicating the position of the recognized face, which is normalized to a value of 1 when the recognized face is positioned in the center of the image and to a value of 0 when the recognized face is positioned at the edge of the image.

The face position is calculated by dividing a difference obtained by subtracting X from Y by Y for example, where X represents a length of a line which connects the center of the recognized face and the center of the image, and Y represents a length of a line, which connects the center of the image and the edge of the image through the center of the recognized face.

The face angle 414 is a value indicating the angle of the recognized face relative to the front direction in the image, which is normalized to a value of 1 when the angle of the recognized face is perpendicular to the plane of the image and to a value of 0 when the angle of the recognized face is horizontal to the plane of the image.

The face angle is calculated by dividing a difference obtained by subtracting X from 180 by 180 for example, where X represents a degree of the angle of the recognized face relative to the front direction in the image.

The coordinates 415 are composed of a pair of a coordinate of the upper-left corner and a coordinate of the lower right corner of a rectangle having the smallest area among rectangles surrounding the region of the recognized face.

The color feature value 403 is composed of a ratio of the number of pixels having each of colors to the total number of pixels constituting the image calculated by the image feature value extraction unit 205, and indicates a feature of the colors of the image.

For example, image feature information with respect to an image having an image ID 401 "00001" includes color feature value 403 that indicates that the image has a red feature 421 of 10%, a blue feature 422 of 20%, a green feature of 60%, and a white feature of 10%.

Returning to FIG. 2 again, the description continues on the functional structure of the image classification device 100.

The image feature information reading writing unit 203 connects with the image feature value extraction unit 205 and the main character degree information calculation unit 206. The image feature information reading writing unit 203 has a function of reading and writing image feature information from and into the image feature information storage unit 232.

The event name information reception unit 211 connects with the main character degree information calculation unit 206. The event name information reception unit 211 has a function of receiving an event name, which is a name of an image group, input from a user of the image classification device 100.

The sample image reception unit 213 connects with the sample image writing unit 214. The sample image reception unit 213 has a function of receiving an image in which a particular person's face appears and a name specifying the particular person.

The image group data reception unit 213 receives an image from an external recording medium via the external recording medium reading writing device 140, from an external device via the USB control device 150, or from an external communication device via the communication device 180.

The sample image storage unit 236 is a storage region for storing digital photographs, which are each an image, as pieces of image data encoded in the JPEG format, and is implemented as a part of the regions of the built-in hard disk of the hard disk device 130.

The pieces of image data are in one-to-one correspondence with names each specifying a person appearing in a corresponding image.

The sample image writing unit 214 connects with the sample image reception unit 213. The sample image writing unit 214 has a function of writing, into the sample image storage unit 236, an image and a name specifying a person appearing in the image received by the sample image reception unit 213.

The main character degree information calculation unit 206 connects with the image reading writing unit 202, the image feature information reading writing unit 203, the main character degree information reading writing unit 204, and the event name information reception unit 211. The main character degree information calculation unit 206 has the following five functions.

Function 1: a function of, With respect to each of recognized faces appearing in images included in an image group, extracting a face feature, distinguishing between the recognized faces based on the extracted features such that recognized faces judged to indicate the same person belong to the same recognized face group, and assigning, to each of recognized face groups, a label for specifying the recognized face group Here, the face features are each, for example, information on a relative positional relation between parts of a human face such as eyes, a nose, a mouse, and an area ratio of each of these parts to the area of the face.

Function 2: a function of generating a face correspondence table (described later) showing correspondence between a label and recognized faces included in a recognized face group specified by the label, and writing the generated face correspondence table into the face correspondence table storage unit 235

Function 3: a function of, with respect to each of persons indicated by the recognized faces included in the recognized face group to which the label is assigned, calculating a main character degree (described later)

Function 4: a function of calculating a privateness degree (described later) based on the main character degree of each of the persons indicated by the recognized faces included in the recognized face group, who appears in the images of the image group, to which the label is assigned Function 5: a function of generating main character degree information (described later) based on the calculated main character degree, the calculated privateness degree, an event name received by the event name information reception unit 211, and so on The face correspondence table storage unit 235 is a storage region for storing a face correspondence table, and is implemented as a part of the regions of the hard disk built in the hard disk device 130.

FIG. 5 shows the data structure of a face correspondence table stored in the face correspondence table storage unit 235.

As shown in FIG. 5, the face correspondence table includes, in correspondence, labels 501 each for specifying a recognized face group including recognized faces that are distinguished to indicate the same person and face IDs 502, 503, 504, . . . that are IDs for specifying recognized faces included in a recognized face group that are distinguished to indicate the same person.

For example, a label 501 "son" specifies a recognized face group that includes recognized faces identified by a face ID 502 "0001", a face ID 503 "0003", and a face ID 504 "0101".

Returning to FIG. 2 again, the description continues on the functional structure of the image classification device 100.

The main character degree information storage unit 233 is a storage region for storing main character degree information, and is implemented as a part of the regions of the hard disk built in the hard disk device 130.

FIG. 6 shows the data structure of main character degree information stored in the main character degree information storage unit 233.

As shown in FIG. 6, the main character degree information includes, with respect to each image group, an image group ID 601 for specifying the image group, one or more labels 602 each for specifying a recognized face group including recognized faces appearing in images included in the image group, dispersion degrees 603 one-to-one corresponding to the labels 602, main character degrees 604 one-to-one corresponding to the labels 602, an event name 605 corresponding to the image group, a privateness degree 606 corresponding to the image group.

A dispersion degree 603 is information indicating a degree of dispersion of one or more images in which a person specified by the corresponding label 602 appears, which are included in an image group specified by a corresponding image group ID 601, among all the images included in the image group, in terms of the order of photographing time of all the images included in the image group. The dispersion degree 603 has a value of 0-1. As the degree of dispersion increases, the dispersion degree 603 has a greater value.

A calculation method of the dispersion degree 603 is detailed later in the section <Dispersion Degree Calculation Processing>.

A main character degree 604 is information indicating, with respect to an image group specified by a corresponding image group ID 601, an importance degree of a person indicated by recognized faces included in a recognized face group having assigned thereto a corresponding label 602. The main character degree 604 has a value of 0 or higher. As the importance degree of the person is higher, the main character degree 604 has a greater value.

A calculation method of the main character degree 604 is detailed later in the section <Main Character Degree Generation Processing>.

A privateness degree 606 is an index indicating, with respect to an image group specified by a corresponding image group ID 601, an importance degree of a member of a family compared to an importance degree of a person other than the member of the family. The privateness degree 606 has a value indicating one of degrees "extremely high", "high", "moderate", and "low".

A calculation method of the privateness degree 606 is detailed later in the section <Privateness Degree Calculation Processing>.

Returning to FIG. 2 again, the description continues on the functional structure of the image classification device 100.

The main character degree information reading writing unit 204 connects with the main character degree information calculation unit 206 and the image group classification unit 208. The main character degree information reading writing unit 204 has a function of reading and writing main character degree information from and into the main character degree information storage unit 233.

The event feature information storage unit 234 is a storage region for storing event feature information, and is implemented as a part of the regions of the hard disk built in the hard disk device 130.

FIG. 7 shows the data structure of event feature information stored in the event feature information storage unit 234.

As shown in FIG. 7, the event feature information includes classification destination events such as a "birthday party", an "athletic meet", an "excursion", a "wedding party", and a "trip" that are each in correspondence with (1) one of values indicating the privateness degrees 701 including a degree "extremely high" 711, a degree "high" 712, a degree "moderate" 713, and a degree "low" 714 and (2) one of members of important persons including a "son" 721, a "mother" 722, a "father" 723, and "all members of family" 724.

Here, the important person indicates a person having a main character degree of a value of 3 or greater in an image group, for example. In the case where the important persons are all the members of the family, the son, the mother, and the father each have a main character degree of a value of 3 or greater.

For example, the classification destination event "birthday party" corresponds to the privateness degree 701 indicating the degree "extremely high" 711 and the important person 702 indicating the "son" 721. This shows that the classification destination event "birthday party" has an extremely high privateness degree and has the son as the important person. Also, the classification destination event "trip" corresponds to the privateness degree 701 indicating the degree "extremely high" 711 and the important person 702 indicating the "all members of family" 724. This shows that the classification destination event "trip" has an extremely high privateness degree and has all members of the family as the important person.

Returning to FIG. 2 again, the description continues on the functional structure of the image classification device 100.

The event feature information reading writing unit 209 connects with the image group classification unit 208 and the event feature information reception unit 212. The event feature information reading writing unit 209 has a function of reading and writing event feature information from and into the event feature information storage unit 234.

The event feature information reception unit 212 connects with the event feature information reading writing unit 209. The event feature information reception unit 212 has a function of receiving event feature information input by the user of the image classification device 100.

The image group classification unit 208 connects with the image reading writing unit 202, the main character degree information reading writing unit 204, the event feature information reading writing unit 209, and the classification result output unit 210. The image group classification unit 208 has a function of, via the main character degree information reading writing unit 204, reading main character degree information from the main character degree information storage unit 233, and classifying an image group corresponding to the read main character degree information into a classification destination event based on the read main character degree information and event feature information stored in the event feature information storage unit 234.

The classification result output unit 210 connects with the image group classification unit 208. The classification result output unit 210 has a function of displaying, on the display 193, a result of classification of an image group performed by the image group classification unit 208.

The following describes the operations of the image classification device 100 having the structure as described above, with reference to the drawings.

<Operations>

The image classification device 100 performs, as characteristic operations, image group classification processing of receiving an input of images included in an image group, and classifying the image group including the images into a classification destination event.

Also, the image group classification processing includes face correspondence table generation processing of generating a face correspondence table, dispersion degree calculation processing of calculating a dispersion degree, and main character degree information generation processing of generating main character degree information.

The following describes separately the processing with reference to the drawings.

<Image Group Classification Processing>

Figure 8:
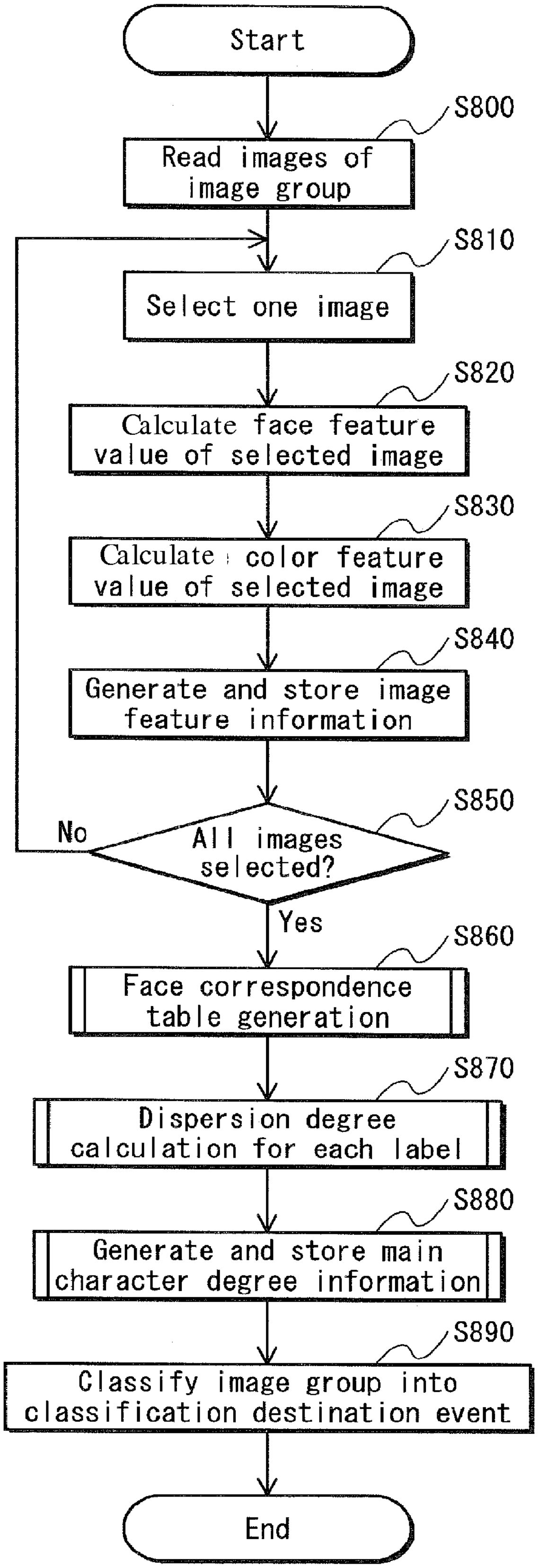
FIG. 8 is a flowchart of image group classification processing.

FIG. 8 is a flowchart of image group classification processing performed by the image classification device 100.

When the remote control 197 receives an operation instructing to start image group classification processing from a user, the image classification device 100 starts image group classification processing.

In the image group classification processing, the image group data reception unit 201 starts reading images included in an image group, and the event name information reception unit 211 starts receiving an event name of an event at which the images included in the image group was photographed (Step S800).

The image group data reception unit 201 reads images, from an external recording medium mounted in the external recording medium reading writing device 140, from an external device via the USB cable 195 connected to the USB control device 150, or from the communication device 180 connected to the network 194.

Here, the image group data reception unit 201 reads, from the external recording medium reading writing device 140, images included in an image group recorded in the SD memory card 191 that is an external storage medium.

The image group data reception unit 201 reads, one by one, pairs that are each composed of one of the images recorded in the SD memory card 191 and a time and date at which the image was photographed, and sequentially assigns image IDs to the respective read images. Then, the image group data reception unit 201 writes, into the real data storage directory 324 included in the image storage unit 231, pieces of image data of the images, pieces of metadata, the image IDs in one-to-one correspondence with each other via the image reading writing unit 202.

In response to an operation of the remote control 197 performed by the user, the event name information reception unit 211 receives the event name of the event at which the images included in the image group was photographed.

After writing of all of the images included in the image group into the image storage unit 231 completes, the image feature value extraction unit 205 reads, one by one, the images included in the image group received by the image group data reception unit 201 from the image storage unit 231 via the image reading writing unit 202 (Step S810).

With respect to each of the images read by the image feature calculation control unit 221, the image feature value extraction unit 205 attempts to recognize one or more faces appearing in the image with reference to the face models stored therein. The image feature value extraction unit 205 calculates a face feature value with respect to each of the recognized faces, and sequentially assigns, to each of the recognized faces, a face ID for specifying the recognized face (Step S820).

After completing the processing of the Step S820, with respect to each of pixels constituting the image, the image feature value extraction unit 205 specifies a color of the pixel based on a brightness of each of color components of the pixel. Then, with respect to each of the specified colors, the image feature value extraction unit 205 calculates, as a color feature value 403, a ratio of the number of pixels having the specified color to the total number of pixels constituting the image (Step S830).

After completing the processing of Step S830, the image feature value extraction unit 205 generates image feature information based on a face area, a face position, a face angle, and coordinates that are calculated with respect to a recognized face, the calculated color feature value 403, and information on a photographing time included in a piece of metadata of the image. Then, the image feature value extraction unit 205 writes the generated image feature information into the image feature information storage unit 232 via the image feature information reading writing unit 203 (Step S840).

When not completing generation of respective pieces of image feature information with respect to all the images included in the image group received by the image group data reception unit 201 (Step S850: No), the image feature value extraction unit 205 performs processing of Step S810 and subsequent steps on each of images whose image feature information has not yet been generated.

When the image feature value extraction unit 205 completes generation of respective pieces of image feature information with respect to all the images included in the image group received by the image group data reception unit 201 (Step S850: Yes), the main character degree information calculation unit 206 reads, via the image feature information reading writing unit 203, the respective pieces of image feature information generated with respect to all the images included in the image group received by the image group data reception unit 201, which are stored in the image feature information storage unit 232.

After reading the respective pieces of image feature information with respect to all the images included in the image group, the main character degree information calculation unit 206 performs face correspondence table generation processing of generating a face correspondence table (Step S860).

The following describes face correspondence table generation processing performed by the main character degree information calculation unit 206 with reference to the figure.

<Face Correspondence Table Generation Processing>

Figure 9:
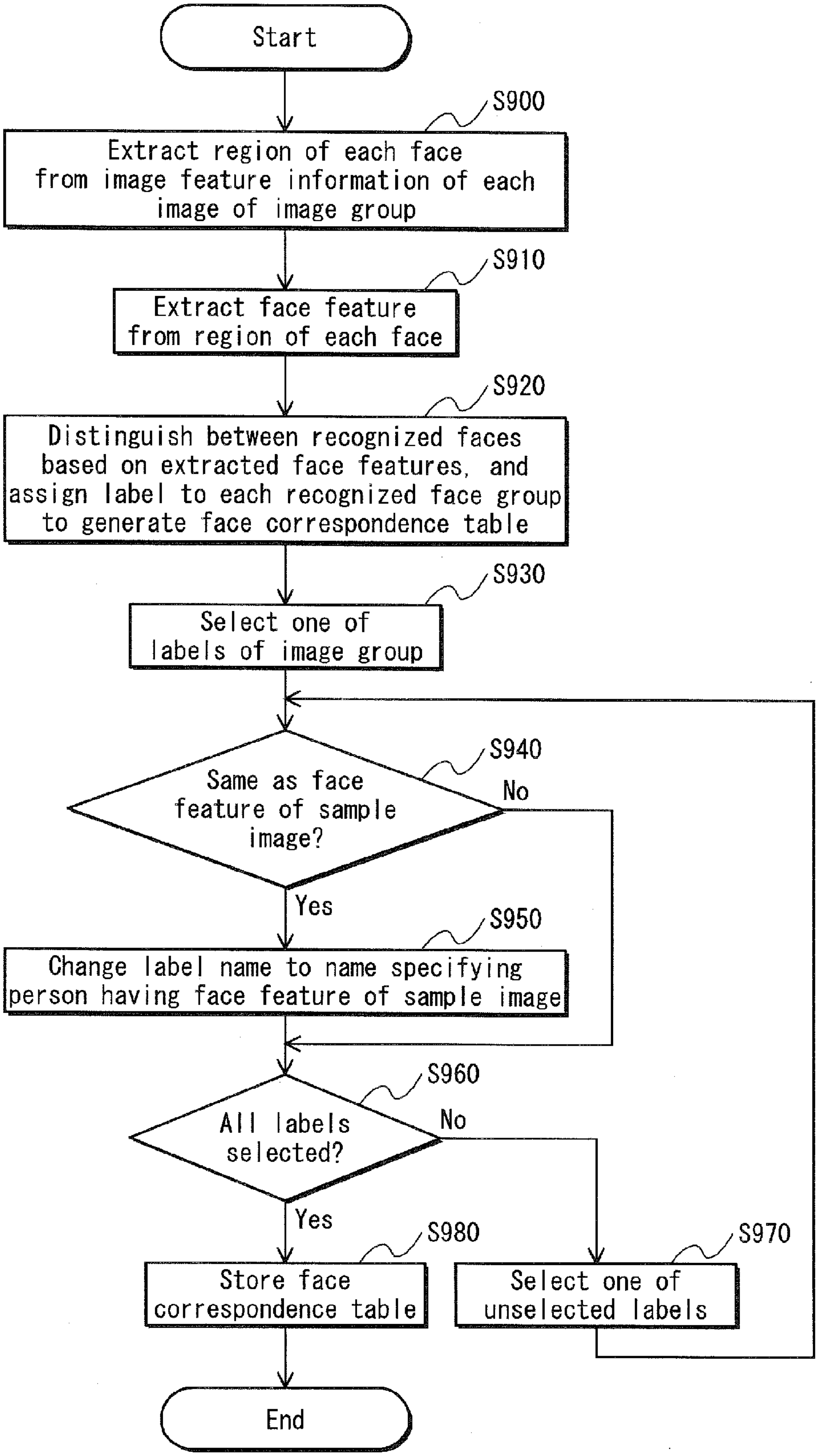
FIG. 9 is a flowchart of face correspondence table generation processing.

FIG. 9 is a flowchart of face correspondence table generation processing performed by the main character degree information calculation unit 206.

In the face correspondence table generation processing, the main character level information calculation unit 206 extracts, from each of all the read pieces of image feature information, a face ID for specifying each recognized face, coordinates of a region of a face specified by the face ID, and an image ID (Step S900).

The main character degree information calculation unit 206 reads an image specified by an image ID included in the piece of image feature information from the image storage unit 231 via the image reading writing unit 202, and extracts a face feature from a region of the face defined by the coordinates of the region of the recognized face specified by the extracted face ID (Step S910).

The main character degree information calculation unit 206 judges a plurality of faces having the same face feature among the extracted face features to indicate the same person, and distinguishes between recognized faces such that the recognized faces judged to indicate the same person belong to the same recognized face group, and assigns, to each of recognized face groups, a label for specifying the recognized face group, thereby to generate a face correspondence table (Step S920).

After completing the processing of Step S920, the main character degree information calculation unit 206 selects one of the labels with respect to the image group (Step S930). Then, the main character degree information calculation unit 206 judges persons appearing in images stored in the sample image storage unit 236 (hereinafter "sample images") includes a person whose face has any of the face features of the recognized faces included in the recognized face group specified by the selected label (Step S940).

Here, the sample image storage unit 236 for example stores therein, as sample images, an image in which a son who is a member of a family appears, an image in which a mother who is a member of the family appears, and an image in which a father who is a member of the family appears. Names specifying these persons appearing in the respective images are "son", "mother", and "father".

If judging that the persons appearing in the sample images includes a person having the face feature in Step S940 (Step S940: Yes), the main character degree information calculation unit 206 changes a name of the selected label to a name specifying the person having the face feature (Step S950).

If judging that the persons appearing in the sample images does not include a person having the face feature in Step S940 (Step S940: No), or when completing the processing of Step S950, the main character degree information calculation unit 206 judges whether all the labels have been selected (Step S960).

If judging that there are one or more unselected labels in Step S960 (S960: No), the main character degree information calculation unit 206 selects one of the unselected labels (Step S970), and performs processing of Step S940 and subsequent steps on the selected label.

If judging that all the labels have been selected in Step S960 (Step S960: Yes), the main character degree information calculation unit 206 writes the generated face correspondence table into the face correspondence table storage unit 235 (Step S980), and ends the face correspondence table generation processing.

Returning to FIG. 8, the description continues on the image group classification processing.

After completing the face correspondence table generation processing, namely, the processing of Step S860, the main character degree information calculation unit 206 performs dispersion degree calculation processing of calculating a dispersion degree corresponding to each of the labels with respect to the image group (Step S870).

The following describes variety calculation processing performed by the main character degree information calculation unit 206 with reference to the drawings.

<Variety Level Calculation Processing>

Figure 10:
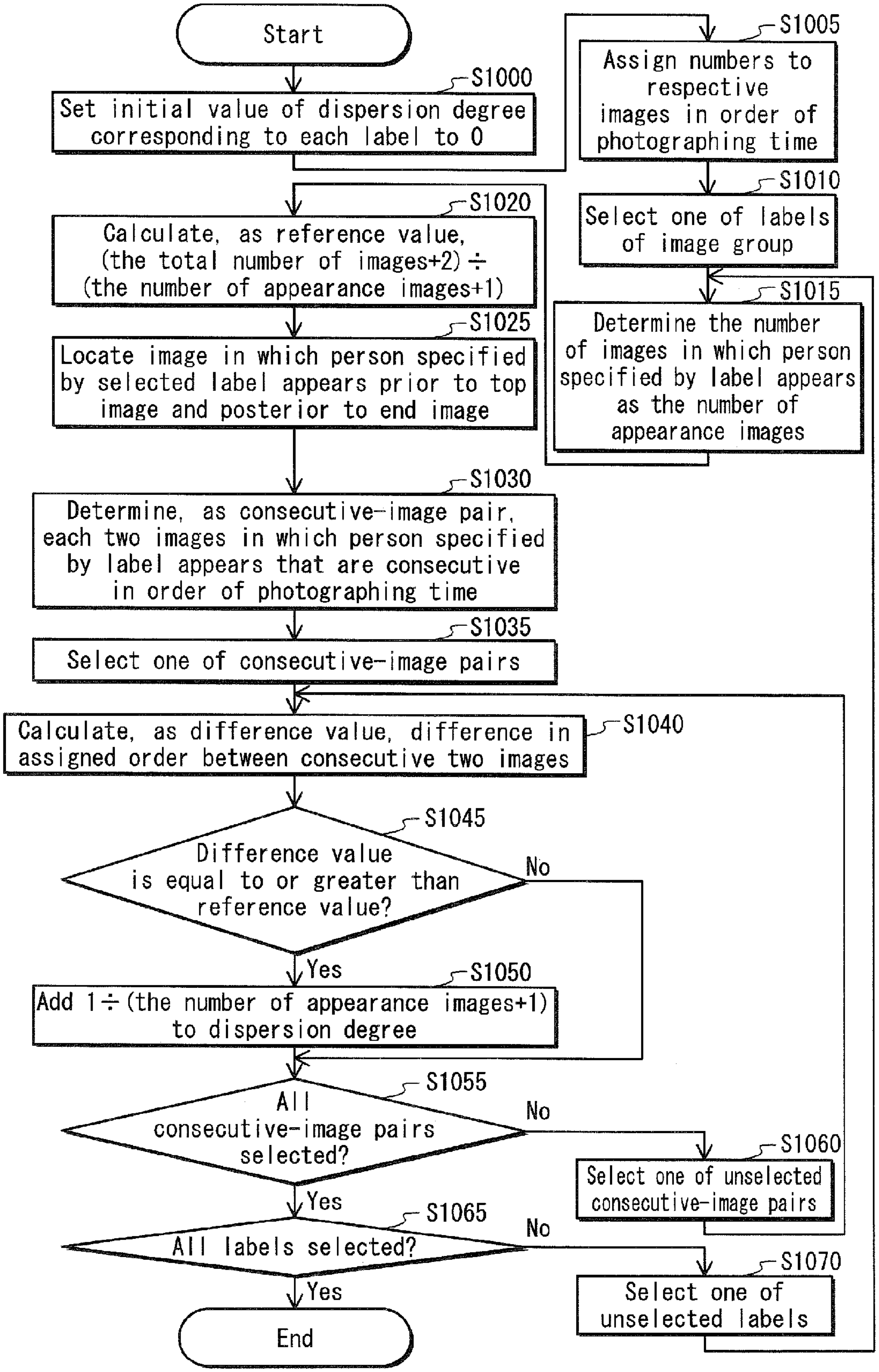
FIG. 10 is a flowchart of dispersion degree calculation processing.

FIG. 10 is a flowchart of dispersion degree calculation processing performed by the main character degree information calculation unit 206.

In the dispersion degree calculation processing, the main character degree information calculation unit 206 sets, with respect to an image group, an initial value of each of dispersion degrees one-to-one corresponding to labels to 0 (Step S1000), and assigns numbers to respective images included in the image group in order of photographing time, with reference to pieces of metadata stored in the image storage unit 231 in one-to-one correspondence with the images (Step S1005).

After completing the processing of Step S1005, the main character degree information calculation unit 206 selects one of the labels with respect to the image group (Step S1010), and determines the number of images in which a person specified by the selected label appears as the number of appearance images of the specified person (Step S1015).

After completing the processing of Step S1015, the main character degree information calculation unit 206 divides a sum of a value of 2 and the total number of images included in the image group by a sum of a value of 1 and the number of appearance images to obtain a quotient, and rounds off the quotient thereby to obtain a value as a reference value (Step S1020).

After completing the processing of Step S1020, the main character degree information calculation unit 206 assumes that an image in which the person specified by the selected label appears is located each of prior to an image at the top of the images (the 0th) and posterior to an image at the end of the images (the n+1st when the total number of images is n) when the images are arranged in order of photographing time (Step S1025).

After completing the processing of Step S1025, the main character degree information calculation unit 206 determines, with respect to images in which the person specified by the selected label appears, each two images that are consecutive in order of photographing time as a consecutive-image pair (Step S1030).

After completing the processing of Step S1030, the main character degree information calculation unit 206 selects one of the consecutive-image pairs (Step S1035), calculates a difference in assigned number between two images of the selected consecutive-image pair as a difference value (Step S1040), and compares the calculated difference value with the reference value to judge whether the difference value is equal to or greater than the reference value (Step S1045).

If judging that the difference value is equal to or greater than the reference value in Step S1405 (Step S1045: Yes), the main character degree information calculation unit 206 adds, to the dispersion degree corresponding to the selected label, a reciprocal of a sum of a value of 1 and the number of appearance images of the person specified by the specified label, thereby to obtain a value as a new dispersion degree corresponding to the selected label (Step S1050).

After completing the processing of Step S1050, or if judging that the difference value is smaller than the reference value in Step S1045 (Step S1045: No), the main character degree information calculation unit 206 judges whether all the consecutive-image pairs have been selected (Step S1055).

If judging that there are one or more unselected consecutive-image pairs in Step S1055 (Step S1055: No), the main character degree information calculation unit 206 selects one of the unselected consecutive-image pairs (Step S1060), and performs processing of Step S1040 and subsequent steps on the selected consecutive-image pair.

If judging that all the consecutive image pairs have been selected in Step S1055 (Step S1055: Yes), the main character degree information calculation unit 206 further judges whether all the labels have been selected (Step S1065).

If judging that there are one or more unselected labels in Step S1065 (Step S1065: No), the main character degree information calculation unit 206 selects one of the unselected labels (Step S1070), and performs processing of Step S1015 and subsequent steps on the selected label.

If judging that all the labels have been selected in Step S1065 (Step S1065: Yes), the main character degree information calculation unit 206 ends the dispersion degree calculation processing.

Returning to FIG. 8 again, the description continues on the image group classification processing.

After completing the dispersion degree calculation processing, namely, the processing of Step S870, the main character degree information calculation unit 206 performs main character degree information generation processing of generating and storing main character degree information with respect to each image group (Step S880).

The following describes main character degree information generation processing performed by the main character degree information calculation unit 206 with reference to the figure.

<Main Character Degree Information Generation Processing>

Figure 11:
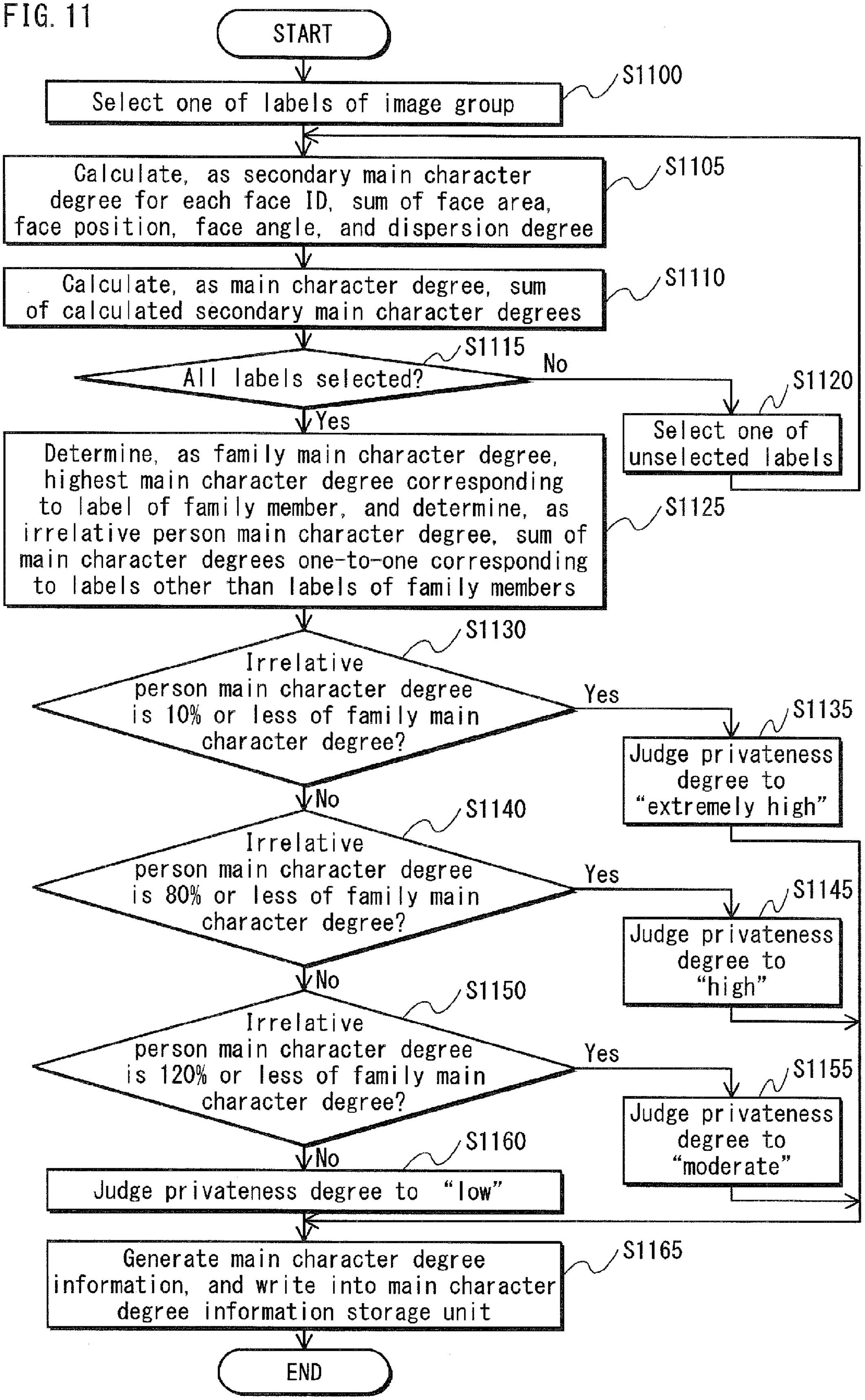
FIG. 11 is a flowchart of main character degree information generation processing.

FIG. 11 is a flowchart of main character degree information generation processing performed by the main character degree information calculation unit 206.

In the main character degree information generation processing, the main character degree information calculation unit 206 selects one of labels with respect to an image group (Step S1100), and calculates the sum of a face area, a face position, a face angle, and a dispersion degree for each of face IDs corresponding to the selected label, as a secondary main character degree of the face ID.

After completing the processing of Step S1105, the main character degree information calculation unit 206 calculates the sum of the calculated secondary main character degrees as a main character degree (Step S1110), and judges whether all the labels have been selected (Step S1115).

If judging that there are one or more unselected labels in Step S1115 (Step S1115: No), the main character degree information calculation unit 206 selects one of the unselected labels (Step S1120), and performs processing of Step S1105 and subsequent steps on the selected label.

If judging that all the labels have been selected in Step S1115 (Step S1115: Yes), the main character degree information calculation unit 206 determines, as a family main character degree, the highest main character degree among the main character degrees one-to-one corresponding to labels of members of a family (son, mother, and father here). The main character degree information calculation unit 206 determines, as an irrelative person main character degree, the sum of the main character degrees one-to-one corresponding to labels other than the labels of the members of the family (Step S1125), and then judges whether or not the irrelative person main character degree is 10% or less of the family main character degree (Step S1130).

If judging that the irrelative person main character degree is 10% or less of the family main character degree in Step S1130 (Step S1130: Yes), the main character degree information calculation unit 206 judges that a privateness degree is "extremely high" (Step S1135).

If judging that the irrelative person main character degree is higher than 10% of the family main character degree in Step S1130 (Step S1130: No), the main character degree information calculation unit 206 further judges whether or not the irrelative person main character degree is 80% or less of the family main character degree (Step S1140).

If judging that the irrelative person main character degree is 80% or less of the family main character degree in Step S1140 (Step S1140: Yes), the main character degree information calculation unit 206 judges that the privateness degree is "high" (Step S1145).

If judging that the irrelative person main character degree is higher than 80% of the family main character degree in Step S1140 (Step S1140: No), the main character degree information calculation unit 206 further judges whether or not the irrelative person main character degree is 120% or less of the family main character degree (Step S1150).

If judging that the irrelative person main character degree is 120% or less of the family main character degree in Step S1150 (Step S1150: Yes), the main character degree information calculation unit 206 judges that the privateness degree is "moderate" (Step S1155).

If judging that the irrelative person main character degree is higher than 120% of the family main character degree in Step S1150 (Step S1150: No), the main character degree information calculation unit 206 judges that the privateness degree is "low".

After completing the processing of Step S1135, after completing the processing of Step S1145, after completing the processing of Step S1155, or after completing the processing of Step S1160, the main character degree information calculation unit 206 generates main character degree information based on the selected labels, the calculated dispersion degrees one-to-one corresponding to the labels, the calculated main character degrees one-to-one corresponding to the labels, an event name received by the event name information reception unit 211, and the calculated privateness degree. The main character degree information calculation unit 206 writes the generated main character degree information into the main character degree information storage unit 233 via the main character degree information reading writing unit 204 (Step S1165), and ends the main character degree information generation processing.

Returning to FIG. 8, the description continues on the image group classification processing.

After completing the main character degree information generation processing, namely, the processing of Step S880, the image group classification unit 208 reads the written main character degree information via the main character degree information reading writing unit 204, and reads event feature information stored in the event feature information storage unit 234 via the event feature information reading writing unit 209.

Then, the image group classification unit 208 compares the read main character degree information with the read event feature information. If judging that the event feature information includes a classification destination event corresponding to a combination of the main character degree and the privateness degree included in the main character degree information, the image group classification unit 208 determines the corresponding classification destination event as a classification destination event into which an image group corresponding to the main character degree information is to be classified.

If judging that the event feature information does not include a corresponding classification destination event, the image group classification unit 208 determines a classification destination event "others" as a classification destination event into which the image group corresponding to the main character degree information is to be classified.

After determining the classification destination event into which the corresponding image group is to be classified, the image group classification unit 208 classifies the image group. Specifically, the image group classification unit 208 creates, via the image reading writing unit 202, an event directory having the same event name corresponding to the image group under an event directory corresponding to the classification destination event into which the corresponding image group is to be classified. Then, the image group classification unit 208 stores information indicating addresses of pieces of image data of all the images included in the image group under the event directory such that the pieces of image data of all the images included in the image group are linked to the event directory (Step S890).

Then, the classification result output unit 210 displays, on the display 193, an event name of the classification destination event into which the image group is to be classified which is determined by the image group classification unit 208, together with the event name corresponding to the image group. Then, the image classification device 100 ends the image group classification processing.

SPECIFIC EXAMPLES

The following supplements the above description with specific examples.

Figure 12:
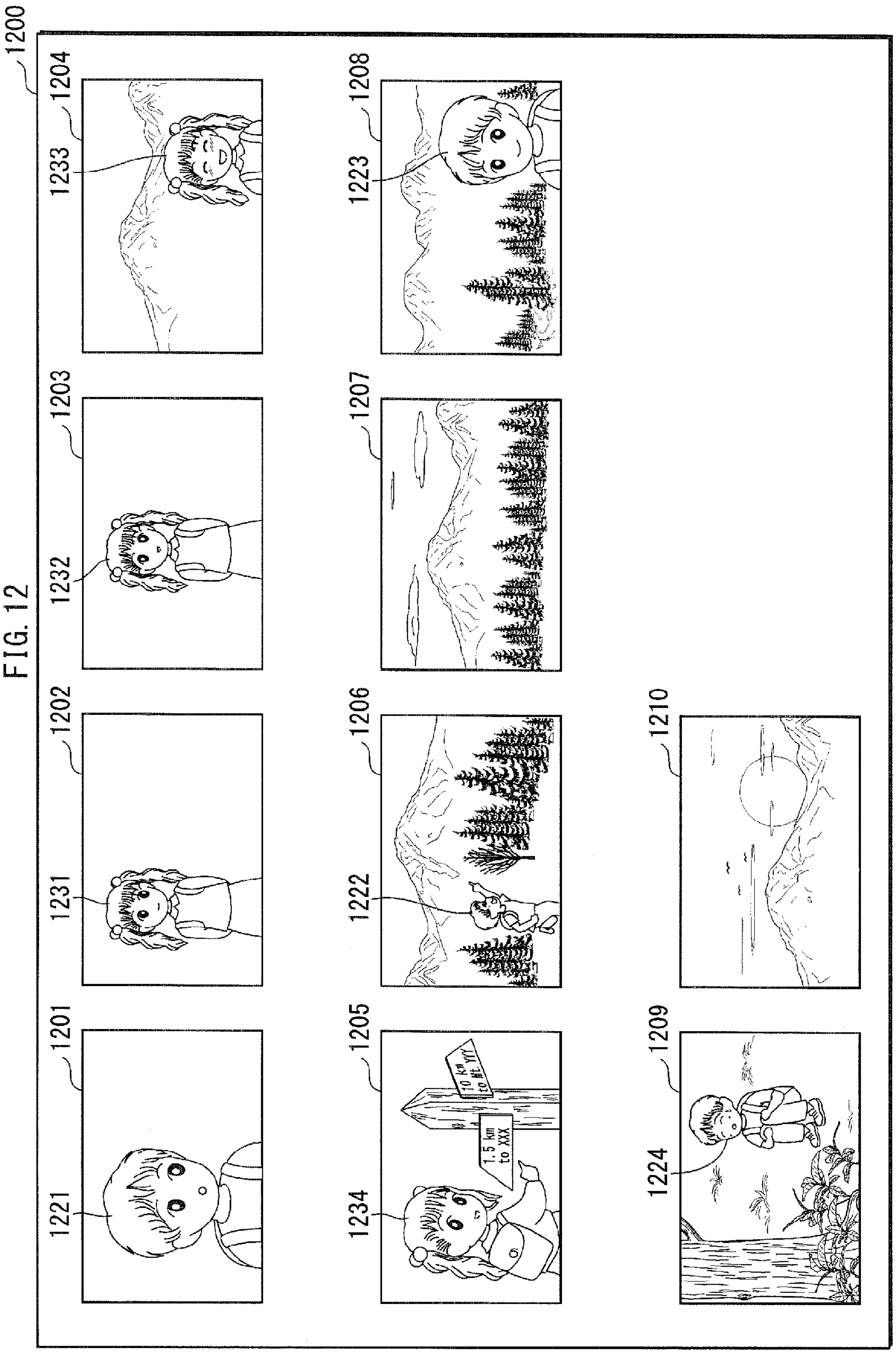

FIG. 12 shows an example of images photographed with respective to an event where a member of a family participated in.

The following supplements the above description on the operations of the dispersion degree calculation processing with reference to FIG. 12.

An image group 1200 is, for example, an image group composed of images 1201-1210 photographed with respective to an event "Mt. Fuji Hike 2009".

Also, the images 1201-1210 have been photographed in ascending order of numbers assigned thereto. Persons 1221-1224 indicate a son of the family (label: son). Persons 1231-1234 indicate the same irrelative person (label: irrelative person A).

The image group 1200 includes ten images in total.

The son appears in four images, and accordingly, the number of appearance images of the son appears is four. A reference value of the son is calculated as follows: $(10+2)\div(4+1)=2.4$ is rounded off to 2.

Difference values of the son are calculated as 1, 5, 2, 1, and 2 in order of photographing time. Accordingly, a dispersion degree of the son is calculated as $\{1\div(4+1)\}\times 3=0.6$.

The irrelative person A appears also in four images, and accordingly the number of appearance images of the irrelative person A is four, as well as that of the son. A reference value of the irrelative person A is calculated as follows: $(10+2)\div(4+1)=2.4$ is rounded off to 2.

Difference values of the irrelative person A are calculated as 2, 1, 1, 1, and 6 in order of photographing time. Accordingly, a dispersion degree of the irrelative person A is calculated as $\{1\div(4+1)\}\times 2=0.4$.

In this way, since the images in which the son appears disperse more widely than the images in which the irrelative person A appears, the dispersion degree of the son is higher than the dispersion degree of the irrelative person A.

Figure 13:
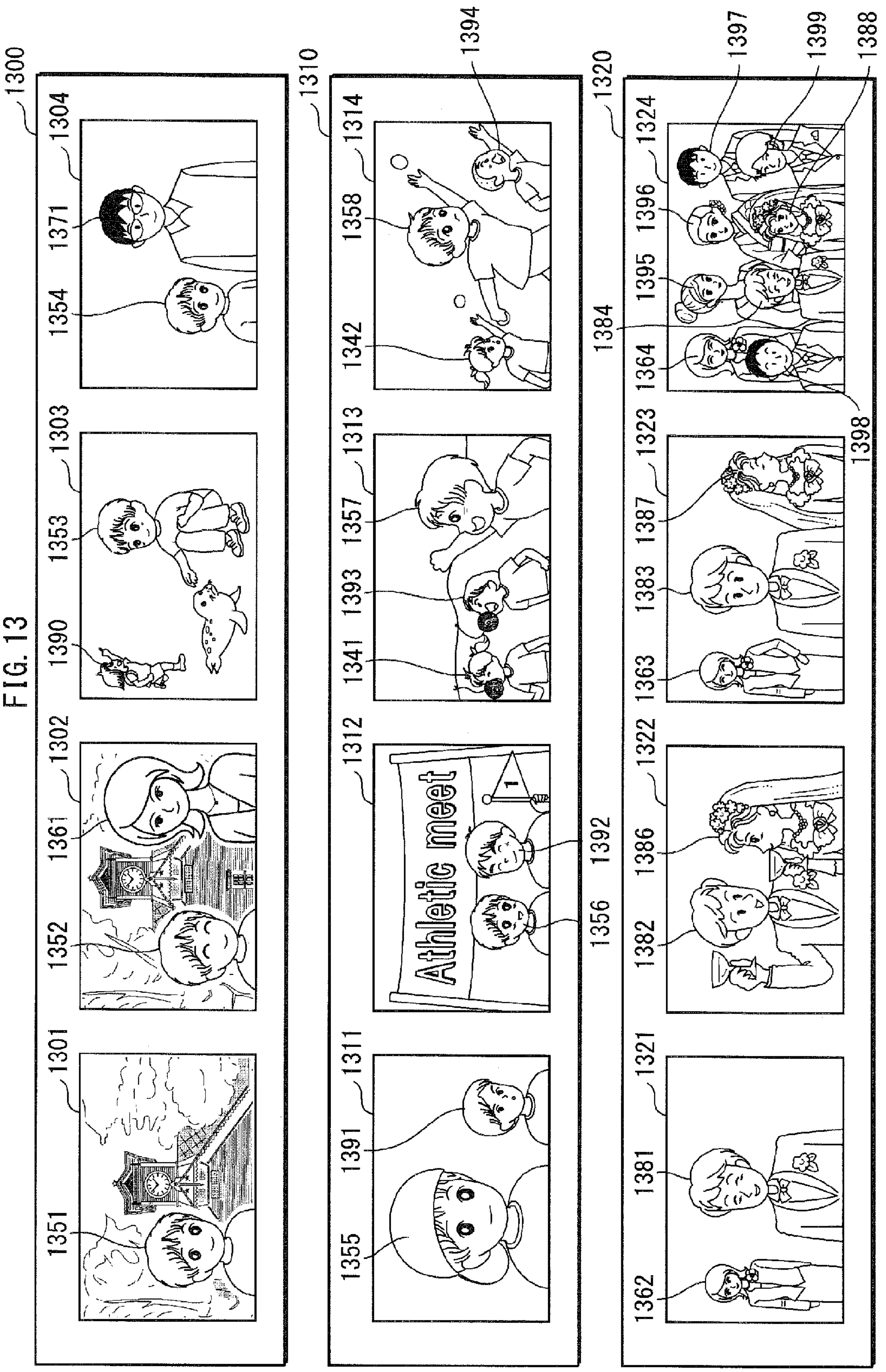

FIG. 13 shows an example of images photographed with respective to an event where members of the family participated in.

The following supplements the above description on the image group classification processing performed by the image group classification unit 208 with reference to FIG. 13.

An image group 1300 is, for example, an image group composed of images 1301-1304 photographed with respective to an event of family trip to Hokkaido (event name: Hokkaido Spring 2010). An image group 1310 is, for example, an image group composed of images 1311-1314 photographed with respective to an event of an athletic meet of the son of the family (event name: Athletic Meet 2009). An image group 1320 is, for example, an image group composed of images 1321-1324 photographed with respective to an event of a wedding party of a relative of the family (event name: Eiko's Wedding Party).

In the images included in the image group 1300, persons 1351-1354 indicate the son of the family, a person 1361 indicates a mother of the family, a person 1371 indicates a father of the family, and a person 1390 indicates an irrelative person.

The image group 1300 includes only one image in which the irrelative person appears. Furthermore, this irrelative person appears as a small person near the edge of the image, and accordingly an irrelative person main character degree of the image group 1300 is low.

Compared with this, the son, the mother, and the father each appear as a comparative large person near the center in the respective images, and accordingly have a high main character degree. Especially since the son appears in all the images included in the image group 1300, a family main character degree of the image group 1300 is high.

As a result, the image group 1300 has an "extremely high" privateness degree, and has "all members of the family" as important persons.

According to the event feature information stored in the event feature information storage unit 234 (see FIG. 7), a classification destination event, which corresponds to an "extremely high" privateness degree and "all members of the family" as important persons, is the classification destination event "trip". Accordingly, the image group 1300, which is composed of the images photographed with respective to the event having the event name "Hokkaido Spring 2010", is classified into the classification destination event "trip".

In the images included in the image group 1310, persons 1355-1358 indicates the son of the family, persons 1391-1394 each indicates a different irrelative person, and persons 1341 and 1342 indicate the same irrelative person.

The image group 1310 includes the images in which a number of irrelative persons appear, and accordingly has an irrelative person main character degree higher than the image group 1300.

On the other hand, the son appears comparatively largely in all the images included in the image group 1310. Accordingly, the main character degree of the son (family main character degree) is higher than the irrelative person main character degree.

Therefore, the image group 1310 has the "high" privateness degree and the "son" as an important person.

According to the event feature information stored in the event feature information storage unit 234, a classification destination event that has the "high" privateness degree and the "son" as an important person is the classification destination event "athletic meet". Accordingly, the image group 1310, which includes the images photographed with respective to the event whose event name is "Athletic Meet 2009", is classified into the classification destination event "athletic meet".

In the images included in the image group 1320, persons 1362-1364 indicates the mother of the family, persons 1395-1399 each indicate a different irrelative person, persons 1381-1384 indicate the same irrelative person, and persons 1386-1388 indicate the same irrelative person.

The image group 1320 includes the images in which a number of irrelative persons appear near the center, and accordingly has an irrelative person main character degree higher than the image group 1310.

On the other hand, although the mother appears in three images included in the image group 1320, the mother appears comparatively small at the edge in the images. Accordingly, the main character degree of the mother (family main character degree) is less than the irrelative person main character degree.

Therefore, the image group 1320 has the "low" privateness degree and the "mother" as an important person.

According to the event feature stored in the event feature information storage unit 234, a classification destination event that has the "low" privateness degree and the "mother" as an important person is the classification destination event "wedding party". Accordingly, the image group 1320, which includes the images photographed with respective to the event whose event name is "Eiko's Wedding Party", is classified into the classification destination event "wedding party".

SUMMARY

The image classification device 100 as described above classifies image groups, which are each composed of images photographed with respective to one event, into classification destination events in units of image groups. Accordingly, it is possible to prevent images photographed with respective to the event from each being classified into a different classification destination event.

Embodiment 2

The following describes a first modified image classification device, as one embodiment of the image classification device relating to the present invention. The first modified image classification device results from partially modifying the image classification device 100 described in the embodiment 1, and executes a different algorithm of dispersion degree calculation processing from that performed by the image classification device 100.

The first modified image classification device has the same hardware structure as the image classification device 100.

However, the first modified image classification device differs from the image classification device 100 in part of the program stored in the ROM 102, which defines the operations of the CPU 101. Accordingly, the first modified image classification device includes a first modified main character degree information calculation unit, which results from modifying the main character degree information calculation unit 206 of the image classification device 100, and performs first modified dispersion degree calculation processing, which results from modifying the dispersion degree calculation processing performed by the image classification device 100.

The following describes the first modified image classification device relating to an embodiment 2, focusing on the first modified dispersion degree calculation processing that is the difference from that of the image classification device 100, with reference to the figure.

<First Modified Dispersion Degree Calculation Processing>

Figure 14:
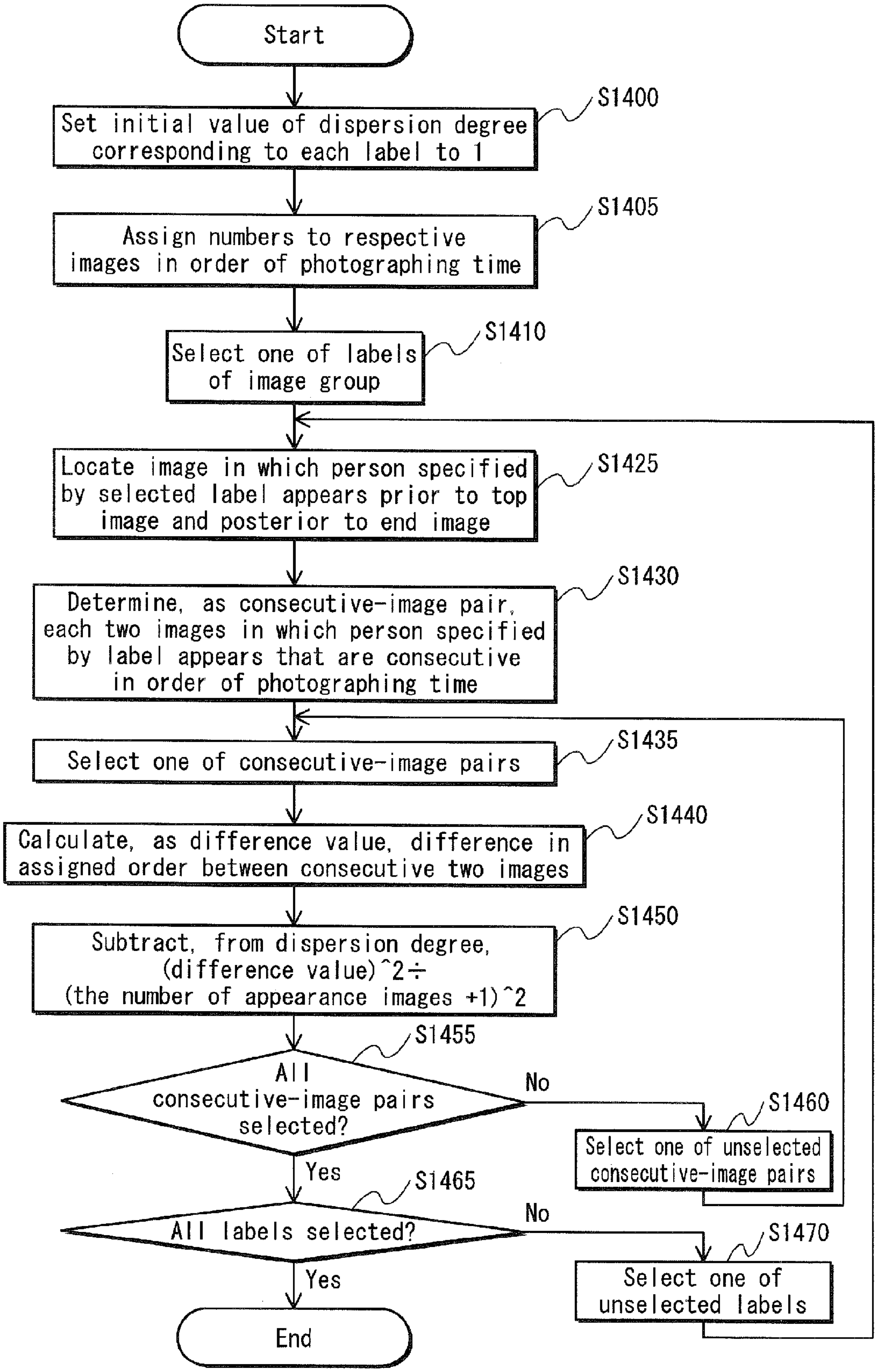
FIG. 14 is a flowchart of first modified dispersion degree calculation processing.

FIG. 14 is a flowchart of first modified dispersion degree calculation processing performed by the first modified main character degree information calculation unit.

In the first modified dispersion degree calculation, the first modified main character degree information calculation unit sets, with respect to an image group, an initial value of each of dispersion degrees one-to-one corresponding to labels to 1 (Step S1400), and performs processing of Step S1405 and processing of Step S1410.

The processing of Step S1405 and the processing of Step S1410 are the same with the processing of Step S1005 and the processing of Step S1010 included in the dispersion degree calculation processing described in the embodiment 1 (see FIG. 10), respectively, and accordingly description thereof is omitted here.

After completing the processing of Step S1410, the first modified main character degree information calculation unit performs processing of Steps S1425-S1440.

The processing of Steps S1425-S1440 are the same with the processing of Steps S1025-S1040 included in the dispersion degree calculation processing described in the embodiment 1, respectively, and accordingly description thereof is omitted here.

After completing the processing of Step S1440, the first modified main character degree information calculation unit divides a squared value of the difference value by a squared value of a sum of a value of 1 and the number of appearance images to obtain a quotient, subtracts the quotient from the current dispersion degree to obtain a difference as a new dispersion degree (Step S1450).

After completing the processing of Step S1450, the first modified main character degree information calculation unit performs processing of Steps S1455-S1470.

The processing of Steps S1455-S1470 are the same with the processing of Step S1055-Step S1070 included in the dispersion degree calculation processing described in the embodiment 1, respectively, and accordingly description thereof is omitted here.

If judging that all the labels have been selected in Step S1465 (Step S1465: Yes), the first modified main character degree information calculation unit ends the first modified dispersion degree calculation processing.

SPECIFIC EXAMPLES

The following supplements the above description with a specific example.

The following supplements the above description on the operations of the first modified dispersion degree calculation processing with reference to FIG. 12.

Difference values of the son are calculated as 1, 5, 2, 1, and 2 in order of photographing time. Accordingly, a dispersion degree of the son is calculated as 1−(1÷10)×(1÷10)−(5÷10)×(5÷10)−(2÷10)×(2÷10)−(1÷10)×(1÷10)−(2÷10)×(2÷10)=0.6 5.

Difference values of the irrelative person A are calculated as 2, 1, 1, 1, and 6 in order of photographing time. Accordingly, a dispersion degree of the irrelative person A is calculated as 1−(2÷10)×(2÷10)−(1÷10)×(1÷10)−(1÷10)×(1÷10)−(1÷10)×(1÷10)−(6÷10)×(6÷10)=0.5 9.

In this way, since the images in which the son appears disperse more widely than the images in which the irrelative person A appears, the dispersion degree of the son is higher than the dispersion degree of the irrelative person A.

SUMMARY

In the same way as in the image classification device 100, the first modified image classification device as described above classifies image groups, which are each composed of images photographed with respective to one event, into classification destination events in units of image groups. Accordingly, it is possible to prevent images photographed with respective to the event from each being classified into a different classification destination event.

Embodiment 3

The following describes a second modified image classification device, as one embodiment of the image classification device relating to the present invention. The second modified image classification device results from partially modifying the image classification device 100 described in the embodiment 1, and executes a different algorithm of dispersion degree calculation processing from that performed by the image classification device 100.

The second modified image classification device has the same hardware structure as the image classification device 100.

However, the second modified image classification device differs from the image classification device 100 in part of the program stored in the ROM 102, which defines the operations of the CPU 101. Accordingly, the second modified image classification device includes a second modified main character degree information calculation unit, which results from modifying the main character degree information calculation unit 206 of the image classification device 100, and performs second modified dispersion degree calculation processing, which results from modifying the dispersion degree calculation processing performed by the image classification device 100.

The second modified dispersion degree calculation processing includes scene sort processing of sorting each of images included in an image group into a photographing scene.

The following describes the second modified image classification device relating to the embodiment 3, focusing on the second modified dispersion degree calculation processing that is the difference from that of the image classification device 100, with reference to the figure.

<Second Modified Dispersion Degree Calculation Processing>

Figure 15:
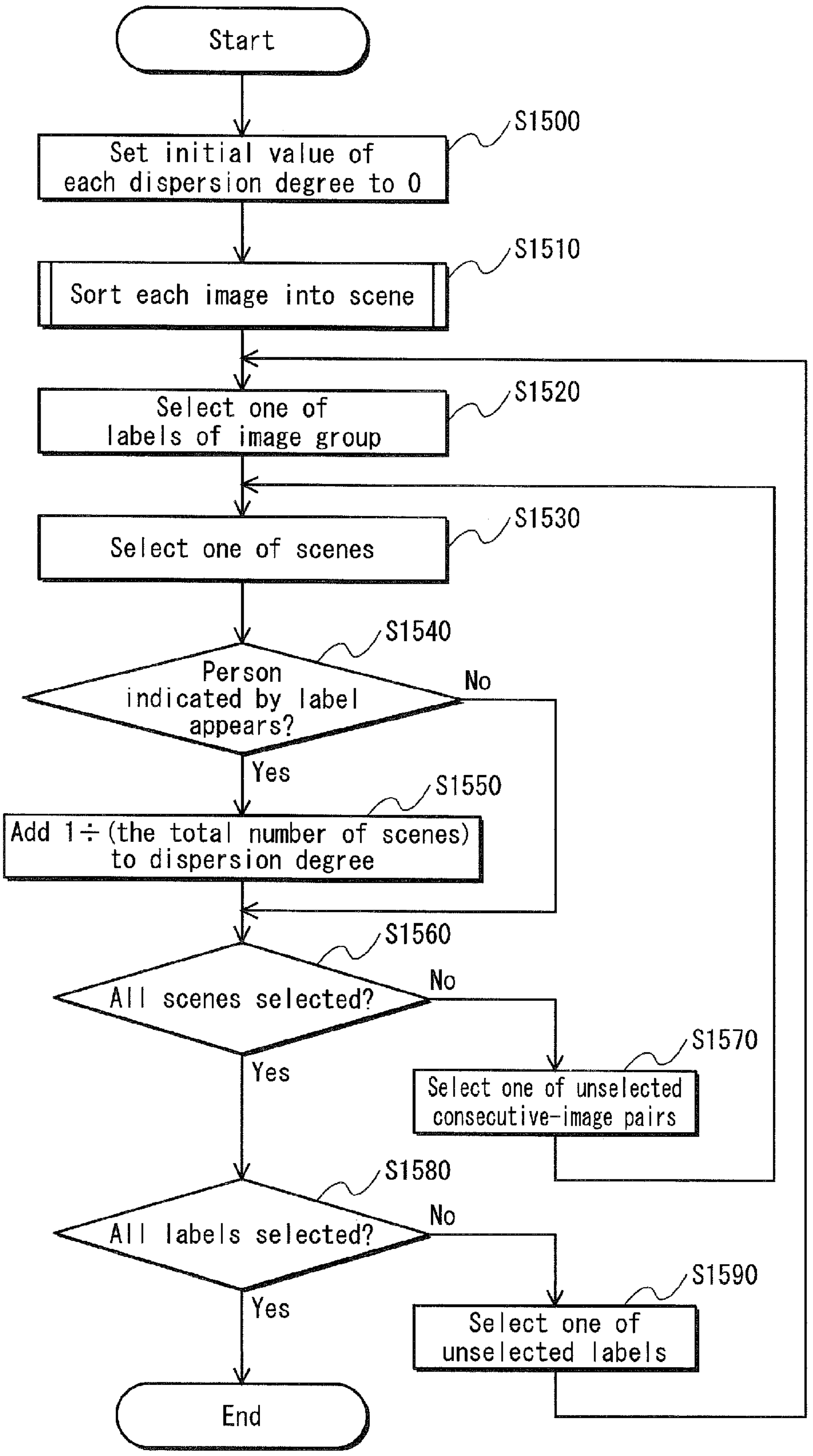
FIG. 15 is a flowchart of second modified dispersion degree calculation processing.

FIG. 15 is a flowchart of second modified dispersion degree calculation processing performed by the second modified main character degree information calculation unit.

In the second modified dispersion degree calculation processing, the second modified main character degree information calculation unit sets, with respect to an image group, an initial value of each of dispersion degrees one-to-one corresponding to labels to 0 (Step S1500), and performs scene sort processing of sorting each of images included in the image group into a photographing scene (Step S1510).

The following describes scene sort processing performed by the second modified main character degree information calculation unit with reference to the figure.

<Scene Sort Processing>

Figure 16:
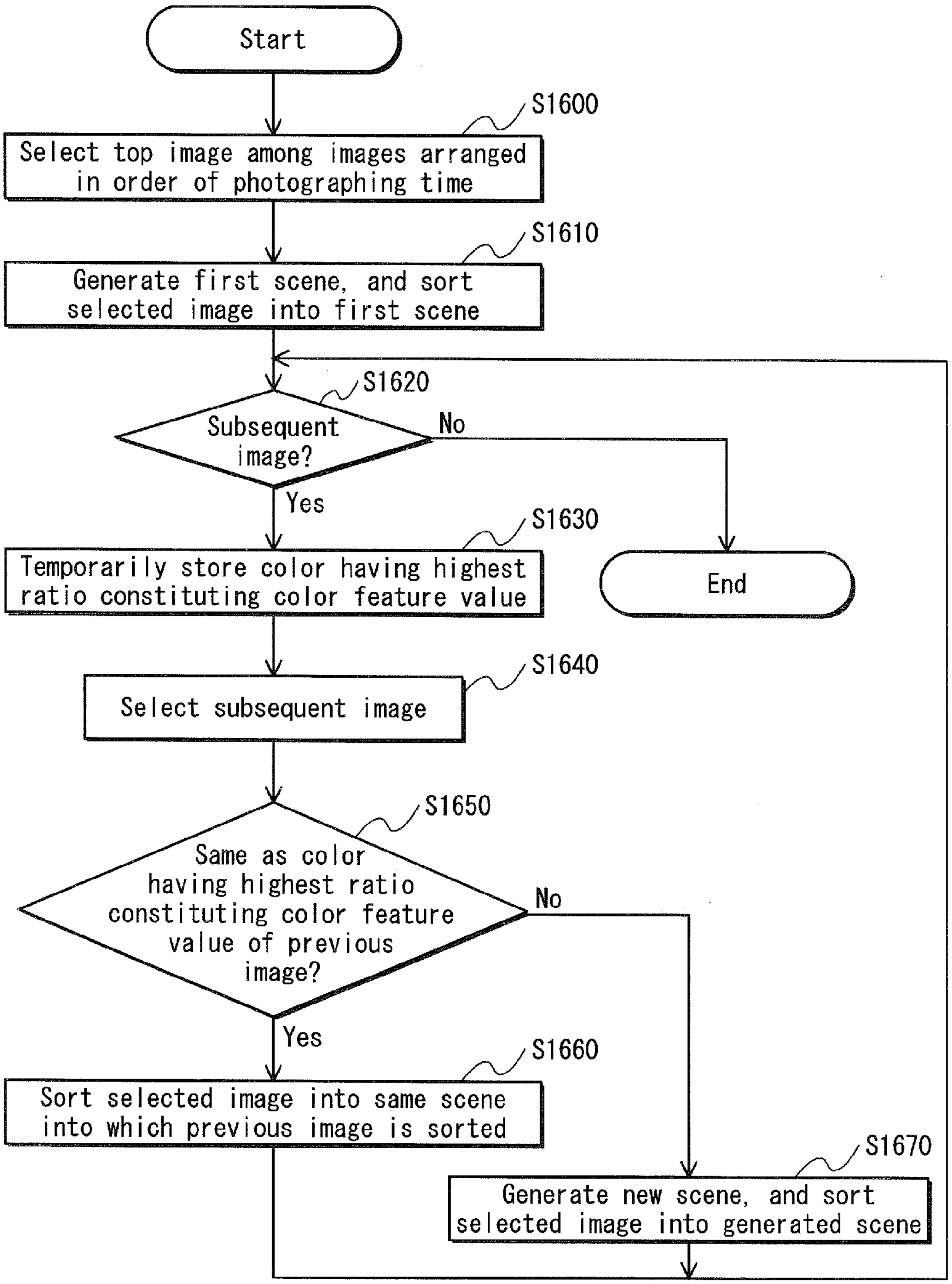
FIG. 16 is a flowchart of scene sort processing.

FIG. 16 is a flowchart of scene sort processing performed by the second modified main character degree information calculation unit.

The scene sort processing is processing of sorting each of images into a scene based on a color having the highest one among ratios constituting a color feature value of the image, on the assumption that images photographed in the same scene have the same color having the highest one among ratios constituting respective color feature values of images.

In the scene sort processing, the second modified main character degree information calculation unit selects an image at the top of images arranged in order of photographing time (Step S1600), generates a first scene, and sorts the selected image at the top into the generated first scene (Step S1610), and then judges whether there is an image subsequent to the selected image at the top in photographing order (Step S1620).

If judging that there is a subsequent image in Step S1620 (Step S1620: Yes), the second modified main character degree information calculation unit temporarily stores therein a color having the highest one among ratios constituting a color feature value of the selected image, with reference to the image feature information stored in the image feature information storage unit 232 (Step S1630).

After completing the processing of Step S1620, the second modified main character degree information calculation unit newly selects an image subsequent to the previously selected image in photographing order, and judges whether a color having the highest one among ratios constituting a color feature value of the newly selected image is the same as the color having the highest one among ratios constituting a color feature value of the previously selected image, with reference to the image feature information stored in the image feature information storage unit 232 (Step S1650).

If judging that the color having the highest one among ratios constituting the color feature value of the newly selected image is the same as the color having the highest one among ratios constituting the color feature value of the previously selected image in Step S1650 (Step S1650: Yes), the second modified main character degree information calculation unit sorts the newly selected image into the same scene into which the previously selected image is sorted (Step S1660).

If judging that the color having the highest one among ratios constituting the color feature value of the newly selected image is not the same as the color having the highest one among ratios constituting the color feature value of the previously selected image in Step S1650 (Step S1650: No), the second modified main character degree information calculation unit generates a new scene, and sorts the newly selected image into the generated new scene (Step S1670).

If judging there is no subsequent image in Step S1620 (Step S1620: No), the second modified main character degree information calculation unit ends the scene sort processing.

Returning to FIG. 15, the description continues on the second modified dispersion degree calculation processing.

After completing the scene sort processing, namely, the processing of Step S1510, the second modified main character degree information calculation unit selects one of the labels with respect to the image group (Step S1520).

After completing the processing of Step S1520, the second modified main character degree information calculation unit selects one of the scenes (Step S1530), and judges whether a person specified by the selected label appears in any of images sorted into the selected scene (Step S1540).

If judging that the person specified by the selected label appears in Step S1540 (Step S1540: Yes), the second modified main character degree information calculation unit adds a reciprocal of the total number of scenes into which all the images included in the image group are classified to a dispersion degree corresponding to the selected label, to obtain a sum as a new dispersion degree (Step S1550).

If completing the processing of Step S1640, or if judging that the person specified by the selected label does not appear in Step S1540 (Step S1540: No), the second modified main character degree information calculation unit judges whether all the scenes have been selected (Step S1560).

If judging that there are one or more unselected scenes in Step S1560 (Step S1650: No), the second modified main character degree information calculation unit selects one of the unselected scenes (Step S1570), and performs processing of Step S1503 and subsequent steps on the selected scene.

If judging that all the scenes have been selected in Step S1560 (Step S1560: Yes), the second modified main character degree information calculation unit further judges whether all the labels have been selected (Step S1580).

If judging that there are one or more unselected labels (S1580: No), the second modified main character degree information calculation unit selects one of the unselected labels (Step S1590), and performs processing of Step S1520 and subsequent steps on the selected label.

If judging that all the labels have been selected (Step S1580: Yes), the second modified main character degree information calculation unit ends the second modified dispersion degree calculation processing.

SPECIFIC EXAMPLES

The following supplements the above description with specific examples.

The following supplements the above description on the operations of the second modified dispersion degree calculation processing with reference to FIG. 12.

In the image group 1200, the images 1201-1205 are sorted into a first scene, the images 1206-1208 are sorted into a second scene, and the images 1209 and 1210 are sorted into a third scene.

The son appears in the first, second, and third scenes, and accordingly, the dispersion degree of the son is calculated as $(1\div3)\times3=1$.

The irrelative person A appears only in the first scene, the dispersion degree of the irrelative person A is calculated as $(1\div3)\times1=0.33$.

In this way, since the images in which the son appears disperse more widely than the images in which the irrelative person A appears, the dispersion degree of the son is higher than the dispersion degree of the irrelative person A.

SUMMARY

In the same way as in the image classification device 100, the second modified image classification device as described above classifies image groups, which are each composed of images photographed with respective to one event, into classification destination events in units of image groups. Accordingly, it is possible to prevent images photographed with respective to the event from each being classified into a different classification destination event.

Advantageous Effects of Invention

As described above, as embodiments of the image classification device relating to the present invention, the description on the embodiments 1-3 has been made that it is possible to perform event classification. With use of a result of the event classification, it is possible to present the user with events classified to the same classification destination, and allow the user to select and play back events classified to the same classification destination. Also, by assigning the same icon to events classified to the same classification destination, it is possible to provide an enhanced user navigation of image viewing. Furthermore, with use of an application according to which the user creates an electronic photo album from the image groups, it is possible to automatically select and present the user with, for each classification destination event such as a wedding party and an athletic meet, templates such as a background image, location information of each image, an image for decoration, and a location thereof.

<Supplementary Description>

As one embodiment of the image classification device relating to the present invention, an example of an image classification device that performs image group classification processing has been described in each of the embodiments 1-3. Alternatively, the present invention may include the following modifications, and is not, of course, limited to the image classification devices described in the above embodiments.

(1) In the embodiment 1, the image classification device 100 stores therein an image as data encoded in the JPEG format. Alternatively, as long as the image can be stored as data, the image may be stored as any data encoded in a format other than the JPEG format such as the PNG (Portable Network Graphics) format and the GIF (Graphics Interchange Format), or unencoded bit-map data.

Also, as an example of an image, a digital photograph is used. Alternatively, as long as the image can be stored as digital data, the image may be data of a scanned painting, for example.

(2) In the embodiment 1, the system LSI 110 is manufactured by integrating the following onto a single integrated circuit: the CPU 101, the ROM 102, the RAM 103, the hard disk device interface 104, the external recording medium reading writing device interface 105, the USB control device interface 106, the output device interface 107, the input device interface 108, the communication device interface 109, the decoder 111, and the bus line 120. Alternatively, as long as the functions of the system LSI 110 can be realized, these units do not necessarily need to be integrated into a single LSI.

(3) In the embodiment 1, the decoder 111 is realized by a DSP. Alternatively, as long as a function of decoding encoded data is exhibited, the decoder 111 does not necessarily need to be realized by a DSP. For example, the CPU 101 or another CPU may function also as the decoder 111. Alternatively, a dedicated circuit composed of ASIC and so on may function as the decoder 111.

(4) In the embodiment 1, the input device 170 has a function of receiving an operation command transmitted wirelessly from a user via the remote control 197. Alternatively, as long as having a function of receiving an operation command from a user, the input device 170 does not necessarily need to have the function of receiving an operation command transmitted wirelessly via the remote control 197. For example, the input device 170 may include a keyboard and a mouse and have a function of receiving an operation command from a user via the keyboard and the mouse, or may include buttons and have a function of receiving an operation command from a user via the buttons.

(5) In the embodiment 1, the image group data reception unit 201 receives designation of two or more images, and reads the designated images as images included in the same image group. Alternatively, as long as a correspondence can be made between images and an image group, the following structure may be employed. For example, the image group data reception unit 201 may receive pieces of image data of images and a list of the images included in the image group, and make a correspondence between the images and the image group based on the received list. Also for example, the image group data reception unit 201 may receive pieces of image data of images, respective pieces of information on photographing times of the images, information indicating a correspondence between the pieces of information on photographing times and an image group, and make a correspondence between the images and the image group based on the received pieces of information on photographing times.

Also, as long as a correspondence can be made between images and an image group, the correspondence does not necessarily need to be made by a user's designation of images. Alternatively, it may be possible to employ the structure of automatically making the correspondence between the images and the image group with use of a conventional technique.

(6) In the embodiment 1, the image group data reception unit 201 sequentially assigns image IDs to respective read images. Alternatively, as long as the image IDs are assigned to the read images with no overlap, the image IDs do not necessarily need to be sequentially assigned.

(7) In the embodiment 1, the image feature value extraction unit 205 attempts to recognize human faces and assigns face IDs to the respective recognized faces. Alternatively, as long as a target on which recognition is to be attempted has a feature for specifying the target, the target does not necessarily need to be a human face. The target may be, for example, a face of a pet animal such as a dog and a cat, a car of a specific model, a specific building, or the like.

(8) In the embodiment 1, the face model is, for example, information on the brightness of a part of a human face such as eyes, a nose, a mouse and a relative positional relation between these parts, and so on. Alternatively, the face model may be other information representing a feature of the face such as information on an eye color, a position of a mole on the face, a skin color, and so on as long as the face is recognizable by the information. Further alternatively, the face model may be any combination of the above plurality of pieces of information each representing a feature of the face as long as the face is recognizable by the combination.

(9) In the embodiment 1, colors specified by the image feature value extraction unit 205 include black, blue, green, and white. Alternatively, colors to be specified may be, for example, red, yellow, and so on.

(10) In the embodiment 1, the privateness degree has a value indicating one of four degrees of "extremely high", "high", "moderate", and "low". Alternatively, as long as the privateness degree is an index indicating an important degree of a member of a family to an important degree of an irrelative person other than members of the family, the privateness degree does not necessarily need to have a value indicating one of the four degrees. For example, the privateness degree may have a value indicating one of ten degrees or may be a numerical value among seamlessly represented numerical values.

Also, the privateness degree is calculated depending on a ratio of a family main character degree to an irrelative person main character degree. Alternatively, as long as the privateness degree is uniquely calculated, the privateness degree does not necessarily need to depend on the ratio of the family main character degree to the irrelative person main character degree. Alternatively, the privateness degree may be calculated based on an absolute value of the irrelative person main character degree. For example, if the irrelative person main character degree has an absolute value of 0, the privateness degree may be judged to the "extremely high" degree.

Furthermore, the privateness degree may be calculated with use of a learning model such as the logistic regression analysis method and the SVM (Support Vector Machine) method, for example.

(11) In the embodiment 1, the image group classification unit 208 classifies an image group into a classification destination event based on a privateness degree and an important person of the image group. Alternatively, as long as the image group is classified into the classification destination event based on an index reflecting a main character degree, the image group does not necessarily need to be classified based on the privateness degree and the important person. For example, the image group may be classified into the classification destination event only based on a privateness degree of a specific person.

FIG. 17 shows the data structure of event feature information for use by the image group classification unit 208 for classifying an image group into a classification destination event only based on a main character degree of a user of an image classification device.

As shown in FIG. 17, the event feature information shows one-to-one correspondence between main character degrees 1701 each indicating a main character degree of the user and classification destination events 1702. For example, the event feature information shows that an image group having the main character degree 1701 of a value less than 1 needs to be classified into a classification destination event "landscape".

Furthermore, image group classification may be performed with use of a learning model such as the logistic regression analysis method and the SVM method or a clustering method such as the K-means method, for example.

(12) In the embodiment 1, the reference value is calculated as follows. A sum of a value of 2 and the total number of images included in an image group is divided by a sum of a value of 1 and the number of appearance images to obtain a quotient, and the quotient is rounded off. Alternatively, as long as the reference value is calculated based on the quotient of the division of the sum of a value of 2 and the total number of images included in the image group by the sum of a value of 1 and the number of appearance images, the quotient does not necessarily need to be rounded off. For example, the quotient itself without being rounded off may be set as the reference value, or a value obtained by rounding down the quotient to one decimal place may be set as the reference value.

(13) In the embodiment 1, the family main character degree is the highest main character degree among the main character degrees one-to-one corresponding to the labels of the members of the family (son, mother, and father here). Alternatively, as long as the family main character degree reflects any of the main character degrees one-to-one corresponding to the labels of the members of the family, the family main character degree does not necessarily need to be the highest one among the main character degrees one-to-one corresponding to the labels of the members of the family. For example, the family main character degree may be a sum of the main character degrees one-to-one corresponding to the labels of the members of the family.

Also, in the embodiment 1, the irrelative person main character degree is the sum of the main character degrees one-to-one corresponding to the labels other than the labels of the members of the family. Alternatively, as long as the irrelative person main character degree reflects a main character degree of a person other than the members of the family, the irrelative person main character degree does not necessarily need to be the sum of the main character degrees one-to-one corresponding to the labels other than the labels of the members of the family. For example, the irrelative person main character degree may be the highest one among main character degrees one-to-one corresponding to persons other than the members of the family, the highest one among main character degrees one-to-one corresponding to persons, who are other than the members of the family, whose faces appear in a plurality of images, or a sum of main character degrees one-to-one corresponding to persons other than the members of the family that are each higher than the main character degrees one-to-one corresponding to the members of the family.

(14) In the embodiment 1, the secondary main character degree is the sum of a face area, a face position, a face angle, and a dispersion degree. Alternatively, as long as the secondary main character degree reflects at least one of the face area, the face position, the face angle, and the dispersion degree, the secondary main character degree does not necessarily need to be the sum of all of the face area, the face position, the face angle, and the dispersion degree. For example, with respect to each image, the secondary main character degree may be a sum of the face area and the dispersion degree, the weighted sum of the face area, the face position, the face angle, and the dispersion degree, a quotient obtained by dividing the sum of the face area, the face position, the face angle, and the dispersion degree by the number of recognized faces appearing in the image, or a quotient obtained by dividing the sum of the face area, the face position, the face angle, and the dispersion degree by the number of recognized faces appearing in the image that are other than recognized faces of persons other than the members of the family.

(15) In the embodiment 1, the image feature value extraction unit 205 sequentially assigns face IDs to respective recognized faces. Alternatively, as long as the face IDs are assigned with no overlap, the face IDs do not necessarily need to be sequentially assigned.

(16) In the embodiment 1, the color feature value indicates the feature of all parts of an image. Alternatively, as long as the color feature value indicates a color feature of the image, the color feature value may indicate a feature of a part of the image such as an upper half part of the image or a plurality of parts of the image such as parts including a 10% left part and a 10% right part of the image.

(17) In the embodiment 1, judgment is made as to whether a certain person appearing in an image is a member of a family by comparing the certain person with a person appearing in a sample image. Alternatively, as long as the certain person is identified as a specific person, the judgment does not necessarily need to be made by comparing the certain person with the person appearing in the sample image. For example, a person appearing in images included in a plurality of image groups may be judged to a member of the family.

(18) In the embodiment 1, the image group classification unit 208 determines a classification destination event into which an image group is to be classified, creates an event directory having the same name as an event corresponding to the image group under an event directory corresponding to the classification destination event into which the image group is to be classified. Then, the image group classification unit 208 provides a link to image data of all the images included in the image group to the created event directory, thereby to classify the image group into the classification destination event. Alternatively, as long as the images included in the image group correspond to the same classification destination event, the image group classification does not necessarily need to be performed by providing a link. For example, a tag may be assigned to the images included in the image group for specifying the classification destination event.

(19) In the embodiment 1, the dispersion degree calculated by the main character degree information calculation unit 206 is the value obtained in the above dispersion degree calculation processing. Alternatively, as long as the value obtained in the above dispersion degree calculation processing is used, the main character degree information calculation unit 206 does not necessarily need to calculate, as the dispersion degree, the value obtained in the above dispersion degree calculation processing. For example, the main character degree information calculation unit 206 may calculate, as the dispersion degree, a product obtained by multiplying the value obtained in the above dispersion degree calculation processing by a quotient obtained by dividing a sum of a value of 1 and the number of appearance images.

The product exemplified here, which results from multiplying the value obtained in the above dispersion degree calculation processing by the quotient obtained by dividing the sum of a value of 1 and the number of appearance images, is normalized to the maximum value of 1.

(20) A control program, which is composed of program code for causing the image group processing and so on described in the embodiments 1-3 to be executed by the CPU of the image classification device and the circuits connected with the CPU, can be recorded in a recording medium, or distributed via various types of communication lines. This type of recording medium may include an IC card, a hard disk, an optical disk, a flexible disk, a ROM, and the like. The distributed control program may be provided for use by storage in a memory or the like read by the CPU, and the various functions described in the embodiments may be realized by the CPU executing the control program. Part of the control program may be transmitted to another device (CPU) that can execute programs and that is different from the content display device via various types of communication lines, and this part of the control program may be executed by the other device.

(21) Furthermore, the following describes the structure of an image classification device relating to one embodiment of the present invention, a modification of the embodiment, and effects of the embodiment and the modification.

(a) The image classification device relating to one embodiment of the present invention is an image classification device comprising: an image specification unit operable to specify, among a plurality of images included in an image group which have been sequentially photographed with respect to one event, one or more images in which an object having a predetermined feature appears; an evaluation value calculation unit operable to calculate an evaluation value of the object having the predetermined feature based on a degree of dispersion of the images specified by the image specification unit among the plurality of images included in the image group in terms of values indicated by respective pieces of time information each reflecting a photographing time of a corresponding one of the plurality of images; and an image group classification unit operable to classify the event relating to the image group based on the evaluation value calculated by the evaluation value calculation unit.

Here, the object having the predetermined feature is, for example, a face of a specific person, a face of a specific pet animal, a car of a specific model, a specific building, or the like.

The image classification device having the above structure classifies, in units of image groups, a plurality of images included in an image group which have been photographed with respect to one event.

Accordingly, it is possible to prevent a plurality of images which have been photographed with respect to an event from each being classified into a different category.

Figure 18:
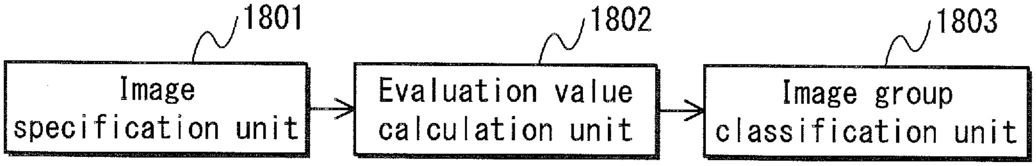
FIG. 18 is a block diagram showing the functional structure of an image classification device relating to a modification.

FIG. 18 is a block diagram showing the functional structure of the image classification device relating to the above modification.

As shown in FIG. 18, the image classification device relating to the above modification includes an image specification unit 1801, an evaluation value calculation unit 1802, and an image group classification unit 1803.

The image specification unit 1801 has a function of specifying, among a plurality of images included in an image group which have been sequentially photographed with respect to one event, one or more images in which an object having a predetermined feature appears. The image specification unit 1801 is realized as the following units described in the embodiment 1 (see FIG. 2) for example: the image group data reception unit 201; the image reading writing unit 202; the image feature information reading writing unit 203; the image feature value extraction unit 205; part of the main character degree information calculation unit 206 (part that realizes the functions 1 and 2); the sample image reception unit 213; the sample image writing unit 214; the image storage unit 231; the image feature information storage unit 232; the face correspondence table storage unit 235; and the sample image storage unit 236.

The evaluation value calculation unit 1802 has a function of calculating an evaluation value of the object having the predetermined feature based on a degree of dispersion of the images specified by the image specification unit 1801 among the plurality of images included in the image group in terms of values indicated by respective pieces of time information each reflecting a photographing time of a corresponding one of the plurality of images. The evaluation value calculation unit 1802 is realized as the following units described in the embodiment 1 for example: the main character level information reading writing unit 204; part of the main character level information calculation unit 206 (part that realizes the functions 3-5); the event name information reception unit 211; and the main character level information storage unit 233.

The image group classification unit 1803 has a function of classifying the event relating to the image group based on the evaluation value calculated by the evaluation value calculation unit 1802. The image group classification unit 1803 is realized as the following units described in the embodiment 1 for example: the image group classification unit 208; the event feature information reading writing unit 209; the classification result output unit 210; the event feature information reception unit 212; and the event feature information storage unit 234.

(b) Also, the image classification device may further comprise: an information reception unit operable to receive information relating to the predetermined feature from a user; and a storage unit operable to generate the predetermined feature based on the information received by the information reception unit, and store therein the generated predetermined feature, wherein the image specification unit may specify the one or more images with use of the predetermined feature stored in the storage unit, and the values indicated by the respective pieces of time information may be each a number assigned to a corresponding one of the plurality of images arranged in order of photographing time.

This structure allows the user to input the information for generating the predetermined feature. Accordingly, it is possible to generate the predetermined feature that reflects the user's tastes.

Furthermore, just with the order of photographing the plurality of images, it is possible to classify the event even if an exact photographing time of each of the plurality of images cannot be confirmed.

(c) Also, the image classification device may further comprise: a reference value calculation unit operable to calculate a reference value, by dividing a sum of a number of the plurality of images and a value of 2 by a sum of a number of the specified images and a value of 1; and a difference value calculation unit operable, with respect to each of consecutive-image pairs that are each composed of two images consecutive in order of photographing time included in the specified images, to calculate a difference value indicating a difference between numbers assigned to the respective two consecutive images arranged in order of photographing time, wherein the evaluation value calculation unit may compare each of the difference values calculated by the difference value calculation unit with the reference value calculated by the reference value calculation unit, and calculate the evaluation value based on a number of consecutive-image pairs each having a difference value that is greater than the reference value.

With this structure, the evaluation value is calculated with use of a combination of four arithmetic operations and matrix-matrix operations. Accordingly, it is possible to realize calculation of an evaluation value performed by the evaluation value calculation unit with use of a combination of known methods.

(d) Also, the image classification device may further comprise: a squared difference value calculation unit operable, with respect to each of consecutive-image pairs that are each composed of two images consecutive in order of photographing time included in the specified images, to calculate a squared difference value by squaring a difference between numbers assigned to the respective two consecutive images arranged in order of photographing time, wherein the evaluation value calculation unit may calculate the evaluation value based on a number of the plurality of images and a sum of the squared difference values calculated with respect to the respective consecutive-image pairs by the squared difference value calculation unit.

With this structure, the evaluation value is calculated with use of a combination of four arithmetic operations. Accordingly, it is possible to realize calculation of an evaluation value performed by the evaluation value calculation unit with use of a combination of known methods.

(e) Also, the image classification device may further comprise: an image subgroup sort unit operable to sort each of the plurality of images included in the image group into one of a plurality of image subgroups in order of photographing time such that images photographed at a same scene are sorted into a same image subgroup, wherein the evaluation value calculation unit may calculate the evaluation value based on a number of image subgroups into which the respective specified images are sorted.

With this structure, the evaluation value is calculated based on the number of scenes into which the images in which the object having the predetermined feature appears are sorted. Accordingly, it is possible to realize calculation of an evaluation value performed by the evaluation value calculation unit with use of a combination of known methods.

(f) Also, the values indicated by the respective pieces of time information may be each a photographing time of a corresponding one of the plurality of images.

With this structure, in the case where the plurality of images included in the image group each correspond to an Exif (Exchangeable Image File Format) file including in advance information indicating a photographing time of a corresponding one of the plurality of images, it is possible to use the corresponding information indicating the photographing time included in the Exif file without newly generating time information.

(g) Also, the image classification device may further comprise: a comparison image specification unit operable to specify, among the plurality of images included in the image group, one or more images in which an object having a feature that is different from the predetermined feature appears; and a comparison evaluation value calculation unit operable to calculate a comparison evaluation value of the object having the different feature a degree of dispersion of the images specified by the comparison image specification unit among the plurality of images included in the image group in terms of the values indicated by the respective pieces of time information, wherein the image group classification unit may classify the image group into the classification destination further based on the comparison evaluation value calculated by the comparison evaluation value calculation unit.

With this structure, it is possible to classify the event more finely compared with a case where the event is classified only based on the one evaluation value calculated from the object having the predetermined feature.

(h) Also, the image classification device may further comprise: an area calculation unit operable to calculate, with respect to each of the specified images, an area of the object in the image, wherein the evaluation value calculation unit may calculate the evaluation value further based on the area of the object calculated by the area calculation unit.

With this structure, the evaluation value is calculated depending on the area of the object having the predetermined feature. For example, the larger the area of the object having the predetermined feature is, the higher the evaluation value is.

(i) Also, the image classification device may further comprise: a position calculation unit operable to calculate, with respect to each of the specified images, a positional difference between a center and the object in the image, wherein the evaluation value calculation unit may calculate the evaluation value further based on the positional difference calculated by the position calculation unit.

With this structure, the evaluation value is calculated depending on the position of the object having the predetermined feature. For example, the closer to the center the position of the object having the predetermined feature is, the higher the evaluation value is.

(j) Also, the object may indicate a face of a person, the image classification device may further comprise a face angle calculation unit operable to calculate, with respect to each of the specified images, an angle of the face of the person relative to a front direction in the image, and the evaluation value calculation unit may calculate the evaluation value further based on the angle of the face of the person calculated by the face angle calculation unit.

With this structure, the evaluation value is calculated depending on the angle of the face of the person having the predetermined feature. For example, the more frontally the face of the person having the predetermined feature is, the higher the evaluation value is.

INDUSTRIAL APPLICABILITY

The image classification device relating to the present invention is widely applicable to devices having a function of storing a plurality of digital images.

REFERENCE SIGNS LIST

100 image classification device
201 image group data reception unit
202 image reading writing unit
203 image feature information reading writing unit
204 main character degree information reading writing unit
205 image feature value extraction unit
206 main character degree information calculation unit
208 image group classification unit
209 event feature information reading writing unit
210 classification result output unit
211 event name information reception unit
212 event feature information reception unit
213 sample image reception unit
214 sample image writing unit
231 image storage unit
232 image feature information storage unit
233 main character degree information storage unit
234 event feature information storage unit
235 face correspondence table storage unit
236 sample image storage unit

The invention claimed is:

1. An image classification device comprising:

a processor; and a non-transitory memory having stored thereon executable instructions, which when executed, cause the processor to function as:

an image specification unit operable to specify, among a plurality of images included in an image group which have been sequentially photographed with respect to one event, one or more images in which a human face having a predetermined feature appears;

a reference value calculation unit operable to calculate a reference value, by dividing a sum of a number of the plurality of images and a value of 2 by a sum of a number of the specified images and a value of 1;

a difference value calculation unit operable, with respect to each of consecutive-image pairs that are each composed of two images consecutive in order of photographing time included in the images specified by the image specification unit among the plurality of images included in the image group, to calculate a difference value indicating a difference between numbers assigned to the respective two consecutive images arranged in order of photographing time;

an evaluation value calculation unit operable to calculate an evaluation value based on a degree of dispersion of the specified images, the evaluation value indicating an importance degree in the image group with respect to a person specified by the human face having the predetermined feature; and an image group classification unit operable to classify the event relating to the image group based on the evaluation value calculated by the evaluation value calculation unit, wherein the evaluation value calculation unit compares each of the difference values calculated by the difference value calculation unit with the reference value calculated by the reference value calculation unit, and calculates the degree of dispersion value based on a number of consecutive-image pairs each having a difference value that is greater than the reference value.

2. The image classification device of claim 1, wherein the processor further functions as an image subgroup sort unit operable to sort each of the plurality of images included in the image group into one of a plurality of image subgroups in order of photographing time such that images photographed at a same scene are sorted into a same image subgroup, and wherein the evaluation value calculation unit calculates the evaluation value based on a number of image subgroups into which the respective specified images are sorted.

3. The image classification device of claim 1, wherein the processor further functions as:

a comparison image specification unit operable to specify, among the plurality of images included in the image group, one or more images in which an object having a feature that is different from the predetermined feature appears; and a comparison evaluation value calculation unit operable to calculate a comparison evaluation value of the object having the different feature a degree of dispersion of the images specified by the comparison image specification unit among the plurality of images included in the image group, and wherein the image group classification unit classifies the image group into the classification destination further based on the comparison evaluation value calculated by the comparison evaluation value calculation unit.

4. The image classification device of claim 1, wherein the processor further functions as an area calculation unit operable to calculate, with respect to each of the specified images, an area of the human face in the image, and wherein the evaluation value calculation unit calculates the evaluation value further based on the area of the human face calculated by the area calculation unit.

5. The image classification device of claim 1, wherein the processor further functions as a position calculation unit operable to calculate, with respect to each of the specified images, a positional difference between a center and the human face in the image, and wherein the evaluation value calculation unit calculates the evaluation value further based on the positional difference calculated by the position calculation unit.

6. The image classification device of claim 1, wherein the processor further functions as a face angle calculation unit operable to calculate, with respect to each of the specified images, an angle of the human face relative to a front direction in the image, and wherein the evaluation value calculation unit calculates the evaluation value further based on the angle of the human face calculated by the face angle calculation unit.

7. The image classification device of claim 1, wherein the processor further functions as:

an information reception unit operable to receive information relating to the predetermined feature from a user; and a storage unit operable to generate the predetermined feature based on the information received by the information reception unit, and store therein the generated predetermined feature, wherein the image specification unit specifies the one or more images with use of the predetermined feature stored in the storage unit.

8. The image classification device of claim 7, wherein the processor further functions as a squared difference value calculation unit operable, with respect to each of consecutive-image pairs that are each composed of two images consecutive in order of photographing time included in the specified images, to calculate a squared difference value by squaring a difference between numbers assigned to the respective two consecutive images arranged in order of photographing time, and wherein the evaluation value calculation unit calculates the evaluation value based on a number of the plurality of images and a sum of the squared difference values calculated with respect to the respective consecutive-image pairs by the squared difference value calculation unit.

9. An image classification method comprising:

an image specification step of specifying, among a plurality of images included in an image group which have been sequentially photographed with respect to one event, one or more images in which a human face having a predetermined feature appears;

a reference value calculation step of calculating a reference value, by dividing a sum of a number of the plurality of images and a value of 2 by a sum of a number of the specified images and a value of 1;

a difference value calculation step of, with respect to each of consecutive-image pairs that are each composed of two images consecutive in order of photographing time included in the images specified by the image specification step among the plurality of images included in the image group, calculating a difference value indicating a difference between numbers assigned to the respective two consecutive images arranged in order of photographing time;

an evaluation value calculation step of calculating, using a processor, an evaluation value based on a degree of dispersion of the specified images, the evaluation value indicating an importance degree in the image group with respect to a person specified by the human face having the predetermined feature; and an image group classification step of classifying the event relating to the image group based on the evaluation value calculated in the evaluation value calculation step, wherein the evaluation value calculation step includes comparing each of the difference values calculated by the difference value calculation step with the reference value calculated by the reference value calculation step, and calculating the degree of dispersion value based on a number of consecutive-image pairs each having a difference value that is greater than the reference value.

10. An A non-transitory computer-readable recording medium having stored thereon an image classification program for causing a computer to execute image classification method, the image classification method comprising:

an image specification step of specifying, among a plurality of images included in an image group which have been sequentially photographed with respect to one event, one or more images in which a human face having a predetermined feature appears;

a reference value calculation step of calculating a reference value, by dividing a sum of a number of the plurality of images and a value of 2 by a sum of a number of the specified images and a value of 1;

a difference value calculation step of, with respect to each of consecutive-image pairs that are each composed of two images consecutive in order of photographing time included in the images specified by the image specification step among the plurality of images included in the image group, calculating a difference value indicating a difference between numbers assigned to the respective two consecutive images arranged in order of photographing time;

an evaluation value calculation step of calculating an evaluation value based on a degree of dispersion of the specified images, the evaluation value indicating an importance degree in the image group with respect to a person specified by the human face having the predetermined feature; and an image group classification step of classifying the event relating to the image group based on the evaluation value calculated in the evaluation value calculation step, wherein the evaluation value calculation step includes comparing each of the difference values calculated by the difference value calculation step with the reference value calculated by the reference value calculation step, and calculating the degree of dispersion value based on a number of consecutive-image pairs each having a difference value that is greater than the reference value.

11. An integrated circuit comprising:

a processor; and a non-transitory memory having stored thereon executable instructions, which when executed, cause the processor to function as:

an image specification unit operable to specify, among a plurality of images included in an image group which have been sequentially photographed with respect to one event, one or more images in which a human face having a predetermined feature appears;

a reference value calculation unit operable to calculate a reference value, by dividing a sum of a number of the plurality of images and a value of 2 by a sum of a number of the specified images and a value of 1;

a difference value calculation unit operable, with respect to each of consecutive-image pairs that are each composed of two images consecutive in order of photographing time included in the images specified by the image specification unit among the plurality of images included in the image group, to calculate a difference value indicating a difference between numbers assigned to the respective two consecutive images arranged in order of photographing time;

an evaluation value calculation unit operable to calculate an evaluation value based on a degree of dispersion of the specified images, the evaluation value indicating an importance degree in the image group with respect to a person specified by the human face having the predetermined feature; and an image group classification unit operable to classify the event relating to the image group based on the evaluation value calculated by the evaluation value calculation unit, wherein the evaluation value calculation unit compares each of the difference values calculated by the difference value calculation unit with the reference value calculated by the reference value calculation unit, and calculates the degree of dispersion value based on a number of consecutive-image pairs each having a difference value that is greater than the reference value.

* * * * *